United States Patent
Nakano et al.

(10) Patent No.: US 12,404,379 B2
(45) Date of Patent: *Sep. 2, 2025

(54) BIAXIALLY ORIENTED POLYPROPYLENE FILM

(71) Applicant: TOYOBO CO., LTD., Osaka (JP)

(72) Inventors: Mahiro Nakano, Inuyama (JP); Toru Imai, Inuyama (JP)

(73) Assignee: TOYOBO CO., LTD., Osaka (JP)

(*) Notice: Subject to any disclaimer, the term of this patent is extended or adjusted under 35 U.S.C. 154(b) by 40 days.

This patent is subject to a terminal disclaimer.

(21) Appl. No.: 18/000,744

(22) PCT Filed: Jun. 9, 2021

(86) PCT No.: PCT/JP2021/021951
§ 371 (c)(1),
(2) Date: Dec. 5, 2022

(87) PCT Pub. No.: WO2021/256350
PCT Pub. Date: Dec. 23, 2021

(65) Prior Publication Data
US 2023/0212362 A1    Jul. 6, 2023

(30) Foreign Application Priority Data
Jun. 17, 2020   (JP) ................. 2020-104871

(51) Int. Cl.
| | |
|---|---|
| C08J 5/18 | (2006.01) |
| B29C 48/00 | (2019.01) |
| B29C 48/08 | (2019.01) |
| B29C 48/21 | (2019.01) |
| B29C 55/14 | (2006.01) |
| B32B 27/08 | (2006.01) |
| B32B 27/32 | (2006.01) |
| B29K 23/00 | (2006.01) |

(52) U.S. Cl.
CPC .............. *C08J 5/18* (2013.01); *B32B 27/08* (2013.01); *B32B 27/32* (2013.01); *B29C 48/0018* (2019.02); *B29C 48/08* (2019.02); *B29C 48/21* (2019.02); *B29C 55/143* (2013.01); *B29K 2023/12* (2013.01); *B29K 2995/0053* (2013.01); *B32B 2250/03* (2013.01); *B32B 2250/242* (2013.01); *B32B 2307/30* (2013.01); *B32B 2307/412* (2013.01); *B32B 2307/418* (2013.01); *B32B 2307/54* (2013.01); *C08J 2323/12* (2013.01)

(58) Field of Classification Search
None
See application file for complete search history.

(56) References Cited

U.S. PATENT DOCUMENTS

| | | | |
|---|---|---|---|
| 6,541,123 B1 | 4/2003 | Taniguchi et al. | |
| 9,637,602 B2 | 5/2017 | Potter et al. | |
| 12,104,025 B2 | 10/2024 | Yamada et al. | |
| 2004/0247879 A1 | 12/2004 | Osada et al. | |
| 2009/0136714 A1 | 5/2009 | Itou | |
| 2010/0225032 A1 | 9/2010 | Nakane et al. | |
| 2014/0220236 A1 | 8/2014 | Denifl et al. | |
| 2015/0267014 A1 | 9/2015 | Neissl et al. | |
| 2016/0304681 A1 | 10/2016 | Potter et al. | |
| 2017/0157803 A1 | 6/2017 | Kuma et al. | |
| 2018/0068791 A1 | 3/2018 | Fujimoto et al. | |
| 2018/0082791 A1 | 3/2018 | Okuyama et al. | |
| 2020/0198298 A1 | 6/2020 | Imanishi et al. | |
| 2021/0213720 A1 | 7/2021 | Yoshii et al. | |
| 2021/0388193 A1 | 12/2021 | Yamada et al. | |
| 2022/0064388 A1 | 3/2022 | Yamada et al. | |
| 2022/0073690 A1 | 3/2022 | Yamada et al. | |
| 2022/0081521 A1 | 3/2022 | Yamada et al. | |
| 2022/0089822 A1 | 3/2022 | Yamada et al. | |
| 2023/0167255 A1 | 6/2023 | Horinouchi et al. | |
| 2023/0203257 A1 | 6/2023 | Taneki et al. | |
| 2023/0212362 A1 | 7/2023 | Nakano et al. | |
| 2023/0235135 A1 | 7/2023 | Horinouchi et al. | |
| 2024/0209167 A1 | 6/2024 | Taneki et al. | |

FOREIGN PATENT DOCUMENTS

| | | |
|---|---|---|
| CN | 103128956 A | 6/2013 |
| CN | 106103553 A | 11/2016 |
| CN | 107406543 A | 11/2017 |

(Continued)

OTHER PUBLICATIONS

Machine translation of JP 2018-141122 A (Year: 2018).*
JPO abstract of JP-2014231584-A (Year: 2014).*
Machine translation of WO 2018/142983 A1 (Year: 2018).*
China National Intellectual Property Administration, First Office Action in Chinese Patent Application No. 202180042537.2 (Nov. 3, 2023).
Japan Patent Office, International Search Report in International Patent Application No. PCT/JP2021/021948 (Aug. 31, 2021).
Japan Patent Office, International Search Report in International Patent Application No. PCT/JP2021/021951 (Aug. 31, 2021).
European Patent Office, Extended European Search Report in European Patent Application No. 21824768.2 (May 21, 2024).

(Continued)

*Primary Examiner* — Ramsey Zacharia
(74) *Attorney, Agent, or Firm* — Leydig, Voit & Mayer, Ltd.

(57) ABSTRACT

Provided is a biaxially oriented polypropylene film that has high stiffness, has excellent heat resistance at a high temperature of 150° C., easily maintains a bag shape when being made into a packaging bag, and has less pitch shift during printing or fewer wrinkles in a sealed portion when being heat-sealed. A biaxially oriented polypropylene film, wherein a stress at 5% elongation (F5) at 23° C. of the biaxially oriented polypropylene film is not lower than 40 MPa in a longitudinal direction and not lower than 160 MPa in a width direction, and a heat shrinkage rate at 150° C. of the biaxially oriented polypropylene film is not higher than 7% in the longitudinal direction and not higher than 16% in the width direction.

16 Claims, No Drawings

(56) References Cited

FOREIGN PATENT DOCUMENTS

| | | | | |
|---|---|---|---|---|
| CN | 108749019 | A | 11/2018 | |
| CN | 108884246 | A | 11/2018 | |
| CN | 109070568 | A | 12/2018 | |
| CN | 110023086 | A | 7/2019 | |
| EP | 0026911 | A1 | 9/1980 | |
| EP | 1090947 | B1 | 7/2008 | |
| EP | 1985649 | A1 | 10/2008 | |
| EP | 3069850 | A1 | 9/2016 | |
| EP | 3124523 | A1 | 2/2017 | |
| EP | 3296348 | A1 | 3/2018 | |
| EP | 3083777 | B1 | 4/2019 | |
| EP | 3124205 | B1 | 4/2021 | |
| EP | 4169716 | A1 | 4/2023 | |
| JP | H05-177790 | A | 7/1993 | |
| JP | H10-180963 | A | 7/1998 | |
| JP | H11-106520 | A | 4/1999 | |
| JP | H11-192680 | A | 7/1999 | |
| JP | 2001-040111 | A | 2/2001 | |
| JP | 2013-177645 | A | 9/2013 | |
| JP | 2014-051657 | A | 3/2014 | |
| JP | 2014231584 | A * | 12/2014 | |
| JP | 2015-199228 | A | 11/2015 | |
| JP | 2017-186561 | A | 10/2017 | |
| JP | 2017-226161 | A | 12/2017 | |
| JP | 2018-130958 | A | 8/2018 | |
| JP | 2018141122 | A * | 9/2018 | ............ B29C 55/12 |
| JP | 6488703 | B2 | 3/2019 | |
| KR | 10-2014-0081807 | A | 7/2014 | |
| KR | 10-2014-0119117 | A | 10/2014 | |
| KR | 10-2015-0035736 | A | 4/2015 | |
| KR | 10-2016-0086327 | A | 7/2016 | |
| KR | 10-2018-0128027 | A | 11/2018 | |
| TW | 201210795 | A | 3/2012 | |
| WO | WO 2013/111779 | A1 | 8/2013 | |
| WO | WO 2014/103713 | A1 | 7/2014 | |
| WO | WO 2015/012324 | A1 | 1/2015 | |
| WO | WO 2015/091839 | A1 | 6/2015 | |
| WO | WO-2015146893 | A1 * | 10/2015 | ........... B29C 55/005 |
| WO | WO 2016/002281 | A1 | 1/2016 | |
| WO | WO 2016/158590 | A1 | 10/2016 | |
| WO | WO 2016/182003 | A1 | 11/2016 | |
| WO | WO 2017/169952 | A1 | 10/2017 | |
| WO | WO 2017/170244 | A1 | 10/2017 | |
| WO | WO 2017/221781 | A1 | 12/2017 | |
| WO | WO-2018142983 | A1 * | 8/2018 | ............ B32B 27/32 |
| WO | WO 2018/180164 | A1 | 10/2018 | |
| WO | WO 2019/244708 | A1 | 12/2019 | |
| WO | WO 2020/137789 | A1 | 7/2020 | |
| WO | WO 2020/137790 | A1 | 7/2020 | |
| WO | WO 2020/137791 | A1 | 7/2020 | |
| WO | WO 2020/137792 | A1 | 7/2020 | |
| WO | WO 2020/137793 | A1 | 7/2020 | |
| WO | WO 2021/193509 | A1 | 9/2021 | |
| WO | WO 2021/256347 | A1 | 12/2021 | |
| WO | WO 2021/261312 | A1 | 12/2021 | |
| WO | WO 2021/261505 | A1 | 12/2021 | |
| WO | WO 2023/286541 | A1 | 1/2023 | |

OTHER PUBLICATIONS

European Patent Office, Extended European Search Report in European Patent Application No. 21827046.0 (May 21, 2024).
Taiwan Intellectual Property Office, Office Action in Taiwanese Patent Application No. 110121798 (Oct. 11, 2024).
Taiwan Intellectual Property Office, Office Action in Taiwanese Patent Application No. 110121813 (Oct. 11, 2024).
Yan, "Processing Technology of Chemical Fibers," Donghua University Press, pp. 108-111 (2018).
China National Intellectual Property Administration, Office Action in Chinese Patent Application No. 201980085955.2 (Aug. 3, 2022).
China National Intellectual Property Administration, Office Action in Chinese Patent Application No. 201980085958.6 (Aug. 2, 2022).
China National Intellectual Property Administration, Second Office Action in Chinese Patent Application No. 201980085958.6 (Feb. 5, 2023).
China National Intellectual Property Administration, Third Office Action in Chinese Patent Application No. 201980085958.6 (May 25, 2023).
China National Intellectual Property Administration, Office Action in Chinese Patent Application No. 201980085964.1 (Aug. 17, 2022).
China National Intellectual Property Administration, Office Action in Chinese Patent Application No. 201980086038.6 (Jul. 22, 2022).
China National Intellectual Property Administration, Second Office Action in Chinese Patent Application No. 201980086038.6 (Feb. 9, 2023).
China National Intellectual Property Administration, Decision of Rejection in Chinese Patent Application No. 201980086038.6 (May 19, 2023).
China National Intellectual Property Administration, Office Action in Chinese Patent Application No. 201980086055.X (Sep. 9, 2022).
China National Intellectual Property Administration, Second Office Action in Chinese Patent Application No. 201980086055.X (Apr. 3, 2023).
China National Intellectual Property Administration, First Office Action in Chinese Patent Application No. 202180022791.6 (Apr. 27, 2023).
China National Intellectual Property Administration, Second Office Action in Chinese Patent Application No. 202180022791.6 (Nov. 9, 2023).
European Patent Office, Extended European Search Report in European Patent Application No. 19901456.4 (Aug. 18, 2022).
European Patent Office, Extended European Search Report in European Patent Application No. 19903250.9 (Aug. 18, 2022).
European Patent Office, Extended European Search Report in European Patent Application No. 19904532.9 (Aug. 18, 2022).
European Patent Office, Extended European Search Report in European Patent Application No. 19905465.1 (Aug. 25, 2022).
European Patent Office, Extended European Search Report in European Patent Application No. 19906094.8 (Aug. 25, 2022).
European Patent Office, Extended European Search Report in European Patent Application No. 21828580.7 (Jun. 17, 2024).
European Patent Office, Extended European Search Report in European Patent Application No. 21829010.4 (Jun. 17, 2024).
Intellectual Property India, Examination Report in Indian Patent Application No. 202147031787 (Nov. 15, 2022).
Intellectual Property India, Hearing Notice in Indian Patent Application No. 202147031787 (Sep. 5, 2023).
Intellectual Property India, Examination Report in Indian Patent Application No. 202147031791 (Jan. 2, 2023).
Intellectual Property India, Examination Report in Indian Patent Application No. 202147031796 (Oct. 21, 2022).
Intellectual Property India, Examination Report in Indian Patent Application No. 202147031803 (Jan. 4, 2023).
Intellectual Property India, Hearing Notice in Indian Patent Application No. 202147031803 (Feb. 1, 2024).
Intellectual Property India, Examination Report in Indian Patent Application No. 202147031909 (Nov. 15, 2022).
Intellectual Property India, Hearing Notice in Indian Patent Application No. 202147031909 (Jul. 4, 2023).
Japan Patent Office, International Search Report in International Patent Application No. PCT/JP2019/049806 (Feb. 10, 2020).
Japan Patent Office, International Search Report in International Patent Application No. PCT/JP2019/049807 (Feb. 10, 2020).
Japan Patent Office, International Search Report in International Patent Application No. PCT/JP2019/049808 (Feb. 10, 2020).
Japan Patent Office, International Search Report in International Patent Application No. PCT/JP2019/049809 (Feb. 10, 2020).
Japan Patent Office, International Search Report in International Patent Application No. PCT/JP2019/049810 (Feb. 10, 2020).
Japan Patent Office, International Search Report in International Patent Application No. PCT/JP2021/011661 (Jun. 15, 2021).
Japan Patent Office, International Search Report in International Patent Application No. PCT/JP2021/022511 (Sep. 7, 2021).

(56) References Cited

OTHER PUBLICATIONS

Japan Patent Office, International Search Report in International Patent Application No. PCT/JP2021/023722 (Jul. 20, 2021).
Japan Patent Office, International Search Report in International Patent Application No. PCT/JP2022/024733 (Aug. 9, 2022).
Korean Intellectual Property Office, Notification of Reason for Refusal in Korean Patent Application No. 10-2021-7023344 (Mar. 4, 2022).
Korean Intellectual Property Office, Office Action in Korean Patent Application No. 10-2021-7023373 (Oct. 25, 2024).
Korean Intellectual Property Office, Office Action in Korean Patent Application No. 10-2021-7023374 (Oct. 28, 2024).
Korean Intellectual Property Office, Notification of Reason for Refusal in Korean Patent Application No. 10-2021-7023397 (Mar. 4, 2022).
Korean Intellectual Property Office, Notification of Reason for Refusal in Korean Patent Application No. 10-2021-7023399 (Mar. 7, 2022).
Taiwan Intellectual Property Office, Office Action in Taiwanese Patent Application No. 108147639 (May 9, 2023).
Taiwan Intellectual Property Office, Office Action in Taiwanese Patent Application No. 108147653 (Jun. 8, 2023).
Taiwan Intellectual Property Office, Office Action in Taiwanese Patent Application No. 108147566 (Jul. 20, 2023).
Taiwan Intellectual Property Office, Office Action in Taiwanese Patent Application No. 113101002 (May 31. 2024).
European Patent Office, Communication pursuant to Article 94(3) EPC in European Patent Application No. 19901456.4 (Feb. 20, 2025).
Hada, "Surface Modification of Plastic Films" Journal of Japan Printing Society, 47(2): 8-13 (2010).
Okamoto, "High Functionality with Low Crystalline Polyolefins," Seikei-Kakou [Polymer Processing], 32(9): 312-316.
Japan Patent Office, Office Action in Japanese Patent Application No. 2023 535194 (May 28, 2024).
Japan Patent Office, Often Action in Japanese Patent Application No. 2023 535194 (Oct. 15, 2024).
European Patent Office, Extended European Search Report in European Patent Application No. 22841885.1 (Jun. 10, 2025).

\* cited by examiner

BIAXIALLY ORIENTED POLYPROPYLENE FILM

TECHNICAL FIELD

The present invention relates to a biaxially oriented polypropylene film having excellent stiffness and heat resistance. More specifically, the present invention relates to a biaxially oriented polypropylene film that easily maintains a bag shape when being made into a packaging bag, has very fewer wrinkles when being heat-sealed, and thus is suitable for use for a packaging bag.

BACKGROUND ART

A biaxially oriented polypropylene film is used for packaging and industrial applications since it has moisture resistance and also has the required stiffness and heat resistance. In recent years, as the applications for which the biaxially oriented polypropylene film is used have expanded, higher performance has been required, and in particular, improvement in stiffness is expected. In consideration of the environment, the biaxially oriented polypropylene film is also required to maintain the strength even if the volume thereof is reduced (the film thickness is decreased). For that purpose, it is indispensable to significantly improve the stiffness. As a means for improving the stiffness, it is known that the crystallinity and melting point of a polypropylene resin are improved by improving the catalyst and the process technology at the time of polymerization of the polypropylene resin. Despite such improvements, no biaxially oriented polypropylene film having sufficient stiffness has existed so far.

In a process for producing a biaxially oriented polypropylene film, a method in which, after stretching in a width direction, a first stage heat treatment is performed while relaxing a film at a temperature equal to or lower than that at the time of stretching in the width direction, and a second stage heat treatment is performed at a temperature between the temperature of the first stage and the temperature of stretching in the width direction (see, for example, Reference Literature 1, etc.) and a method in which, after stretching in a width direction, stretching in a longitudinal direction is performed (see, for example, Reference Literature 2, etc.) have been proposed. Although the film described in Patent Literature 2 has excellent stiffness, after the film is heat-sealed, wrinkles are likely to occur in the sealed portion, so that the film has inferior heat resistance. In addition, the degree of orientation of the film described in Patent Literature 1 is low, and the stiffness of the film is not sufficient.

CITATION LIST

Patent Literature

[PTL 1] International Publication No. WO2016/182003
[PTL 2] Japanese Laid-Open Patent Publication No. 2013-177645

SUMMARY OF THE INVENTION

Problems to be Solved by the Invention

An object of the present invention is to solve the above-described problems. That is, the object of the present invention pertains to a biaxially oriented polypropylene film having excellent stiffness and heat resistance at a high temperature of 150° C. More specifically, the object of the present invention is to provide a biaxially oriented polypropylene film that easily maintains a bag shape when being made into a packaging bag and has very fewer wrinkles in a sealed portion and a portion around the sealed portion when being heat-sealed.

Solution to the Problems

The present inventors have conducted earnest studies in order to achieve the object. As a result, the present inventors have found that a biaxially oriented polypropylene film, wherein a stress at 5% elongation (F5) at 23° C. of the biaxially oriented polypropylene film is not lower than 40 MPa in a longitudinal direction and not lower than 160 MPa in a width direction, and a heat shrinkage rate at 150° C. of the biaxially oriented polypropylene film is not higher than 7% in the longitudinal direction and not higher than 16% in the width direction.

In this case, it is suitable that a heat shrinkage rate of the biaxially oriented polypropylene film at 120° C. is not higher than 2.0% in the longitudinal direction and not higher than 5.0% in the width direction, and the heat shrinkage rate at 120° C. in the longitudinal direction is lower than the heat shrinkage rate at 120° C. in the width direction.

In this case, it is suitable that a refractive index Ny in the width direction of the biaxially oriented polypropylene film is not lower than 1.5230, and ΔNy of the biaxially oriented polypropylene film is not lower than 0.0220.

Further, in this case, it is suitable that the biaxially oriented polypropylene film has a haze of 5.0% or lower.

Furthermore, in this case, it is suitable that the biaxially oriented polypropylene film comprises a base layer (A), an intermediate layer (B), and a surface layer (C).

Furthermore, in this case, it is suitable that a main polypropylene resin forming the base layer (A) has a mesopentad fraction of 97.0% or higher.

Furthermore, in this case, it is suitable that the main polypropylene resin forming the base layer (A) has a crystallization temperature of 105° C. or higher and a melting point of 161° C. or higher.

Furthermore, in this case, it is suitable that the main polypropylene resin forming the base layer (A) has a melt flow rate of 4.0 g/10 minutes or higher.

Furthermore, in this case, it is suitable that an amount of a component having a molecular weight of 100,000 or less in the main polypropylene resin forming the base layer (A) is not smaller than 35% by mass.

Effect of the Invention

Since the biaxially oriented polypropylene film of the present invention has high stiffness and also has excellent heat resistance at a high temperature of 150° C., the biaxially oriented polypropylene film easily maintains a bag shape when being made into a packaging bag, has very fewer wrinkles in a sealed portion when being heat-sealed. Thus, a biaxially oriented polypropylene film that is suitable for use for a packaging bag can be obtained. In addition, since the biaxially oriented polypropylene film has excellent stiffness, the strength of the film can be maintained even when the thickness of the film is decreased, and the film is suitable for use for applications that require higher stiffness.

DESCRIPTION OF EMBODIMENTS

Hereinafter, the biaxially oriented polypropylene film of the present invention will be described in more detail.

The biaxially oriented polypropylene film of the present invention preferably includes a base layer (A), an intermediate layer (B), and a surface layer (C), and the base layer (A), the intermediate layer (B), and the surface layer (C) are preferably adjacent to each other in this order.

Hereinafter, the base layer (A), the intermediate layer (B), and the surface layer (C) will be respectively described in more detail.

(Base Layer (A))

The base layer (A) of the biaxially oriented polypropylene film of the present invention is made of a polypropylene resin composition containing a polypropylene homopolymer described below, as a main component.

(Polypropylene Homopolymer)

As the polypropylene homopolymer used in the base layer (A), a polypropylene polymer that substantially does not contain ethylene and/or an α-olefin having 4 or more carbon atoms is preferable. Even in the case where ethylene and/or an α-olefin component having 4 or more carbon atoms is contained, the amount of the ethylene and/or the α-olefin component having 4 or more carbon atoms is preferably not larger than 0.3 mol %, more preferably not larger than 0.2 mol, and further preferably not larger than 0.1 mol. When the amount of the component is in the above range, the crystallinity is likely to be improved.

Examples of the α-olefin component having 4 or more carbon atoms and included in such a copolymer include 1-butene, 1-pentene, 3-methylpentene-1, 3-methylbutene-1, 1-hexene, 4-methylpentene-1, 5-ethylhexene-1, 1-octene, 1-decene, 1-dodecene, 1-tetradecene, 1-hexadecene, 1-heptadecene, 1-octadecene, and 1-eicosene.

As the polypropylene homopolymer, two or more different polypropylene homopolymers can be used.

(Stereoregularity)

The mesopentad fraction ([mmmm] %), which is an index of the stereoregularity of the polypropylene homopolymer used in the present invention, is preferably in the range of 97.0 to 99.9%, more preferably in the range of 97.5 to 99.7%, further preferably in the range of 98.0 to 99.5%, and particularly preferably in the range of 98.5 to 99.3%.

When the mesopentad fraction is not lower than 97.0%, the crystallinity of the polypropylene resin is increased, the melting point, the degree of crystallinity, and the degree of crystal orientation of crystals in the film are improved, and stiffness and heat resistance at high temperature are easily ensured. When the mesopentad fraction is not higher than 99.9%, the cost can be easily reduced in terms of polypropylene production, and breaking is less likely to occur during film formation. The mesopentad fraction is measured by a nuclear magnetic resonance method (so-called NMR method).

In order to set the mesopentad fraction of the polypropylene homopolymer to be in the above range, a method in which the obtained polypropylene resin powder is washed with a solvent such as n-heptane, a method in which selection of a catalyst and/or co-catalyst and selection of components of the polypropylene resin composition are made as appropriate, etc., are preferably adopted.

(Melting Temperature)

The lower limit of the melting temperature (Tm) of the polypropylene homopolymer included in the biaxially oriented polypropylene film of the present invention is preferably 160° C., more preferably 161° C., further preferably 162° C., even further preferably 163° C., and further preferably 164° C. When the Tm is not lower than 160° C., stiffness and heat resistance at high temperature are easily ensured. The upper limit of the Tm is preferably 170° C., more preferably 169° C., further preferably 168° C., even further preferably 167° C., and particularly preferably 166° C. When the Tm is not higher than 170° C., an increase in cost is easily suppressed in terms of polypropylene production, and breaking is less likely to occur during film formation. The melting temperature can be further increased by blending a crystal nucleating agent into the above-described polypropylene resin.

The Tm is measured by a differential scanning calorimeter (DSC), and the Tm is the main peak temperature of an endothermic peak associated with melting that is observed when 1 to 10 mg of a sample is put into an aluminum pan, the sample is melted at 230° C. for 5 minutes in a nitrogen atmosphere, the temperature is decreased to 30° C. at a scanning rate of −10° C./min, then the sample is retained for 5 minutes, and the temperature is increased at a scanning rate of 10° C./min.

(Crystallization Temperature)

The lower limit of the crystallization temperature (Tc), measured by a DSC, of the polypropylene homopolymer included in the biaxially oriented polypropylene film of the present invention is 105° C., preferably 108° C., and more preferably 110° C. When the Tc is not lower than 105° C., crystallization easily proceeds in stretching in a width direction and a subsequent cooling step, so that stiffness and heat resistance at high temperature are easily ensured. The upper limit of the Tc is preferably 135° C., more preferably 133° C., further preferably 132° C., even further preferably 130° C., particularly preferably 128° C., and most preferably 127° C. When the Tc is not higher than 135° C., an increase in cost is easily suppressed in terms of polypropylene production, and breaking is less likely to occur during film formation. The crystallization temperature can be further increased by blending a crystal nucleating agent into the above-described polypropylene resin.

The Tc is measured by a DSC, and the Tc is the main peak temperature of an exothermic peak that is observed when 1 to 10 mg of a sample is put into an aluminum pan, the sample is melted at 230° C. for 5 minutes in a nitrogen atmosphere, and the temperature is decreased to 30° C. at a scanning rate of −10° C./min.

(Melt Flow Rate)

The melt flow rate (MFR) of the polypropylene homopolymer included in the biaxially oriented polypropylene film of the present invention is preferably 4.0 to 30 g/10 minutes, more preferably 4.5 to 25 g/10 minutes, further preferably 4.8 to 22 g/10 minutes, particularly preferably 5.0 to 20 g/10 minutes, and most preferably 6.0 to 20 g/10 minutes, when being measured according to the condition M (230° C., 2.16 kgf) of JIS K 7210 (1995).

When the MFR of the polypropylene resin is not lower than 4.0 g/10 minutes, a biaxially oriented polypropylene film having low heat shrinkage is easily obtained.

Moreover, when the MFR of the polypropylene resin is not higher than 30 g/10 minutes, the film formability is easily maintained.

From the viewpoint of film characteristics, the lower limit of the MFR (230° C., 2.16 kgf) of the polypropylene homopolymer included in the film is preferably 5.0 g/10 minutes, more preferably 5.5 g/10 minutes, further preferably 6.0 g/10 minutes, particularly preferably 6.3 g/10 minutes, and most preferably 6.5 g/10 minutes.

When the MFR of the polypropylene resin is not lower than 5.0 g/10 minutes, the amount of a low-molecular-weight component of the polypropylene resin included in the film is increased. Thus, by adopting a width-direction stretching step in a later-described film formation process, in addition to further promoting orientation crystallization of the polypropylene resin and making it easy to further increase the degree of crystallinity in the film, the polypropylene molecular chains in the amorphous part are less entangled with each other, so that the heat resistance is easily increased further.

In order to set the MFR of the polypropylene homopolymer to be in the above range, a method in which the average molecular weight or molecular weight distribution of the polypropylene homopolymer is controlled, etc., are preferably adopted.

That is, the lower limit of the amount of a component having a molecular weight of 100,000 or less in a gel permeation chromatography (GPC) integration curve of the polypropylene homopolymer included in the film of the present invention is 35% by mass, preferably 38% by mass, more preferably 40% by mass, further preferably 41% by mass, and particularly preferably 42% by mass.

The upper limit of the amount of the component having a molecular weight of 100,000 or less in the GPC integration curve is preferably 65% by mass, more preferably 60% by mass, and further preferably 58% by mass. When the amount of the component having a molecular weight of 100,000 or less in the GPC integration curve is not larger than 65% by mass, the film strength is less likely to be decreased.

At this time, when a high-molecular-weight component or a long-chain branched component having a long relaxation time is contained, it is easy to adjust the amount of the component having a molecular weight of 100,000 or less contained in the polypropylene resin without significantly changing the overall viscosity. Therefore, it is easy to improve the film-formability without significantly affecting the stiffness and heat shrinkage.

(Molecular Weight Distribution)

The lower limit of mass-average molecular weight (Mw)/number-average molecular weight (Mn), which is an index of the width of the molecular weight distribution, of the polypropylene homopolymer used in the present invention is preferably 3.5, more preferably 4.0, further preferably 4.5, and particularly preferably 5.0. The upper limit of the Mw/Mn is preferably 30, more preferably 25, further preferably 23, particularly preferably 21, and most preferably 20.

The Mw/Mn can be obtained by using GPC. When the Mw/Mn is in the above range, it is easy to increase the amount of the component having a molecular weight of 100,000 or less.

The molecular weight distribution of the polypropylene homopolymer can be adjusted by polymerizing components having different molecular weights in multiple stages in a series of plants, blending components having different molecular weights offline with a kneader, blending catalysts having different performances and performing polymerization, or using a catalyst capable of achieving a desired molecular weight distribution. As for the shape of the molecular weight distribution obtained by GPC, the molecular weight distribution may be a gentle molecular weight distribution having a single peak, or may be a molecular weight distribution having a plurality of peaks and shoulders, in a GPC chart in which the logarithm of molecular weight (M) (log M) is plotted on the horizontal axis and a differential distribution value (weight fraction per log M) is plotted on the vertical axis.

(Propylene-Based Resin Composition)

In the case where using a propylene-based resin composition for forming the base layer (A) mixed with a copolymer of propylene and ethylene and/or an α-olefin having 4 or more carbon atoms in which the amount of ethylene and/or an α-olefin component having 4 or more carbon atoms exceeds 0.3%, the content of the copolymer of propylene and ethylene and/or an α-olefin having 4 or more carbon atoms in which the amount of ethylene and/or an α-olefin component having 4 or more carbon atoms exceeds 0.3%, in the entire polypropylene-based resin used for the base layer (A), is preferably not larger than 5% by weight, more preferably not larger than 3% by weight, further preferably not larger than 1% by weight, and particularly preferably 0% by weight.

(Antistatic Agent)

When a specific diethanolamine fatty acid ester compound, a specific amine compound, and a specific glycerol mono-fatty acid ester compound are used in combination in specific proportions for the propylene resin composition for forming the base layer (A), a biaxially oriented polypropylene-based resin film that has sufficient initial antistatic properties, has excellent antistatic properties lasting for a long period of time, has almost no decrease in initial transparency even when exposed to high temperatures, and has no stickiness, can be obtained.

For example, with respect to 100 parts by weight of the polypropylene resin composition for forming the base layer (A), 0.3 to 0.2 parts by weight of a polyoxyethylene alkylamine mono-fatty acid ester compound (A) in which 2 or more moles of ethylene oxide is added to 1 mole of an amine represented by formula (1),

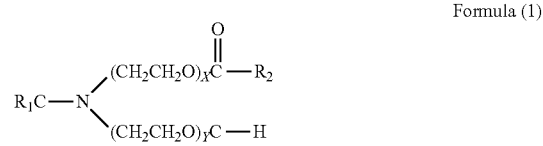

Formula (1)

wherein $R_1$ and $R_2$ are each an alkyl group having 7 to 21 carbon atoms, X and Y are each an integer from 1 to 29, and X+Y is an integer from 2 to 30, 0.03 to 0.2 parts by weight of a glycerol mono-fatty acid ester compound (B) represented by formula (2),

Formula (2)

wherein $R_3$ is an alkyl group having 7 to 21 carbon atoms, 0 to 0.2 parts by weight of a polyoxyethylene alkylamine di-fatty acid ester compound (C) in which 2 or more moles of ethylene oxide is added to 1 mole of an amine represented by formula (3),

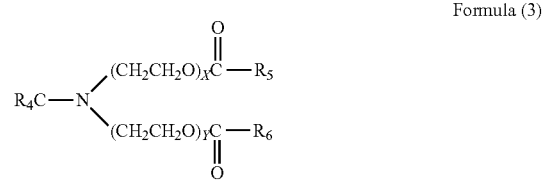

Formula (3)

wherein $R_4$, $R_5$, and $R_6$ are each an alkyl group having 7 to 21 carbon atoms, X and Y are each an integer from 1 to 29, and X+Y is an integer from 2 to 30, and 0 to 0.2 parts by weight of a polyoxyethylene alkenylamine compound (D) in which 2 or more moles of ethylene oxide is added to 1 mole of an amine represented by formula (4),

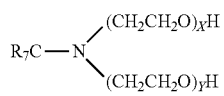

Formula (4)

wherein $R_7$ is an alkenyl group having 7 to 21 carbon atoms, X and Y are each an integer from 1 to 29, and X+Y is an integer from 2 to 30, are preferably contained.

The polyoxyethylene amine monoester compound (A) which is used in the present invention and in which 2 moles of ethylene oxide is added to 1 mole of an amine is a nonionic antistatic agent represented by formula (1), and is contained in a proportion of preferably 0.3 to 1.2 parts by weight and particularly preferably 0.3 to 1.1 parts by weight with respect to 100 parts by weight of the polypropylene-based resin composition for forming the base layer (A). When the content of the compound (A) is not smaller than 0.3 parts by weight, an antistatic effect can be obtained over a long period of time. When the content of the compound (A) is not larger than 1.2 parts by weight, the amount of bleed is small, so that a decrease in transparency due to whitening is small.

The glycerol mono-fatty acid ester compound (B) which is used in the present invention is a nonionic antistatic agent represented by formula (2), R3 is a linear or branched alkyl group, preferably an alkyl group having 10 to 21 carbon atoms, and particularly preferably an alkyl group having 14 to 20 carbon atoms, and the compound (B) is contained in a proportion of preferably 0.03 to 0.3 parts by weight and particularly preferably 0.03 to 0.2 parts by weight with respect to 100 parts by weight of the polypropylene-based resin composition for forming the base layer (A). When the content of the compound (E) is not smaller than 0.03 parts by weight, antistatic properties are quickly developed and an antistatic effect is obtained. When the content of the compound (E) is not larger than 0.3 parts by weight, the amount of bleed is small, so that adhesiveness on the film surface is less likely to occur and a decrease in transparency due to whitening is small.

The polyoxyethylene alkyl diethanolamine compound (C) which is used in the present invention and in which 2 or more moles of ethylene oxide is added to 1 mole of an amine is a nonionic antistatic agent represented by formula (3), and is contained in a proportion of preferably 0 to 0.2 parts by weight and particularly preferably 0.002 to 0.15 parts by weight with respect to 100 parts by weight of the polypropylene-based resin composition for forming the base layer (A). When the content of the compound (C) is not larger than 0.2 parts by weight, the amount of bleed is small, so that a decrease in transparency due to whitening is small.

The polyoxyethylene alkenyl diethanolamine compound (D) which is used in the present invention and in which 2 or more moles of ethylene oxide is added to 1 mole of an amine is a nonionic antistatic agent represented by formula (4), and is contained in a proportion of preferably 0 to 0.2 parts by weight and particularly preferably 0.002 to 0.15 parts by weight with respect to 100 parts by weight of the polypropylene-based resin composition for forming the base layer (A). When the content of the compound (C) is not larger than 0.2 parts by weight, the amount of bleed is small, so that a decrease in transparency due to whitening is small.

In formulas (1) to (4), X and Y are each an integer from 1 to 29, and X+Y is an integer from 2 to 30 and preferably an integer from 2 to 4.

R1 to R6 are each a linear or branched alkyl group, particularly preferably an alkyl group having 13 to 25 carbon atoms, and particularly preferably an alkyl group having 13 to 18 carbon atoms.

Specific examples of the alkyl groups as R1 to R6 in formulas (1) to (3) include a methyl group, an ethyl group, a propyl group, a butyl group, an isobutyl group, a t-butyl group, a pentyl group, an isopentyl group, a nonyl group, a decyl group, an undecyl group, a lauryl group, a trilauryl group, a myristyl group, a pentadecyl group, a palmityl group, a heptadecyl group, a stearyl group, a nonadecyl group, and an eicosyl group.

The alkenyl group as R7 in formula (4) is preferably at least one group selected from higher unsaturated aliphatic groups having 12 to 21 carbon atoms.

Moreover, as long as the effects of the present invention are not impaired, various additives for improving the quality such as slipperiness, for example, lubricants such as wax and metallic soap, plasticizers, and processing aids for improving the productivity, and known heat stabilizers, antioxidants, and UV absorbers which are normally added to a polypropylene-based film, etc., can also be blended into the polypropylene-based resin composition for forming the base layer (A).

(Intermediate Layer (B))
(Polypropylene Resin)

When a later-described polypropylene homopolymer and a later-described copolymer of propylene and ethylene and/or an α-olefin having 4 or more carbon atoms are used for a polypropylene resin composition used for the intermediate layer (B) of the biaxially oriented polypropylene film of the present invention, the lamination strength is easily improved while the stiffness is maintained.

(Polypropylene Homopolymer)

As the polypropylene homopolymer used in the intermediate layer (B), a polypropylene homopolymer that substantially does not contain ethylene and/or an α-olefin having 4 or more carbon atoms is preferable. Even in the case where ethylene and/or an α-olefin component having 4 or more carbon atoms is contained, the amount of the ethylene and/or the α-olefin component having 4 or more carbon atoms is preferably not larger than 0.3 mol %, more preferably not larger than 0.2 mol %, and further preferably not larger than 0.1 mol. When the amount of the component is in the above range, the crystallinity is likely to be improved.

Examples of the α-olefin component having 4 or more carbon atoms and included in such a copolymer include 1-butene, 1-pentene, 3-methylpentene-1, 3-methylbutene-1, 1-hexene, 4-methylpentene-1, 5-ethylhexene-1, 1-octene, 1-decene, 1-dodecene, 1-tetradecene, 1-hexadecene, 1-heptadecene, 1-octadecene, and 1-eicosene.

As the polypropylene homopolymer, two or more different polypropylene homopolymers can be used.

The content of the propylene homopolymer, with respect to the entire polypropylene-based resin used for the intermediate layer (B), is preferably not smaller than 55% by weight, more preferably not smaller than 55% by weight and not larger than 95% by weight, further preferably not smaller than 60% by weight and not larger than 92% by weight, and particularly preferably not smaller than 65% by weight and not larger than 92% by weight.

(Stereoregularity)

The mesopentad fraction ([mmmm]%), which is an index of the stereoregularity of the polypropylene homopolymer, is preferably in the range of 97.0 to 99.9%, more preferably in the range of 97.5 to 99.7%, further preferably in the range of 98.0 to 99.5%, and particularly preferably in the range of 98.5 to 99.3%.

When the mesopentad fraction is not lower than 97.0%, the crystallinity of the polypropylene homopolymer is increased, the melting point, the degree of crystallinity, and the degree of crystal orientation of crystals in the film are improved, and stiffness and heat resistance at high temperature are easily ensured. When the mesopentad fraction is not higher than 99.9%, the cost can be easily reduced in terms of polypropylene production, and breaking is less likely to occur during film formation. The mesopentad fraction is measured by a nuclear magnetic resonance method (so-called NMR method). The mesopentad fraction is more preferably not higher than 99.5%. The mesopentad fraction is measured by a nuclear magnetic resonance method (so-called NMR method).

In order to set the mesopentad fraction of the polypropylene homopolymer to be in the above range, a method in which the obtained polypropylene homopolymer powder is washed with a solvent such as n-heptane, a method in which selection of a catalyst and/or co-catalyst and selection of components of the polypropylene resin composition are made as appropriate, etc., are preferably adopted.

(Melting Temperature)

The lower limit of the melting temperature (Tm) of the polypropylene homopolymer measured by a DSC is preferably 160° C., more preferably 161° C., further preferably 162° C., even further preferably 163° C., and further preferably 164° C. When the Tm is not lower than 160° C., stiffness and heat resistance at high temperature are easily ensured. The upper limit of the Tm is preferably 170° C., more preferably 169° C., further preferably 168° C., even further preferably 167° C., and particularly preferably 166° C. When the Tm is not higher than 170° C., an increase in cost is easily suppressed in terms of polypropylene production, and breaking is less likely to occur during film formation. The melting temperature can be further increased by blending a crystal nucleating agent into the above-described polypropylene homopolymer.

The Tm is measured by a DSC, and the Tm is the main peak temperature of an endothermic peak associated with melting that is observed when 1 to 10 mg of a sample is put into an aluminum pan, the aluminum pan is set in a differential scanning calorimeter (DSC), the sample is melted at 230° C. for 5 minutes in a nitrogen atmosphere, the temperature is decreased to 30° C. at a scanning rate of −10° C./min, then the sample is retained for 5 minutes, and the temperature is increased at a scanning rate of 10° C./min.

(Crystallization Temperature)

The lower limit of the crystallization temperature (Tc) of the polypropylene homopolymer measured by a DSC is 105° C., preferably 108° C., and more preferably 110° C. When the Tc is not lower than 105° C., crystallization easily proceeds in stretching in a width direction and a subsequent cooling step, so that stiffness and heat resistance at high temperature are easily ensured. The upper limit of the Tc is preferably 135° C., more preferably 133° C., further preferably 132° C., even further preferably 130° C., particularly preferably 128° C., and most preferably 127° C. When the Tc is not higher than 135° C., an increase in cost is easily suppressed in terms of polypropylene production, and breaking is less likely to occur during film formation. The crystallization temperature can be further increased by blending a crystal nucleating agent into the above-described polypropylene homopolymer.

The Tc is measured by a differential scanning calorimeter (DSC), and the Tc is the main peak temperature of an exothermic peak that is observed when 1 to 10 mg of a sample is put into an aluminum pan, the aluminum pan is set in a DSC, the sample is melted at 230° C. for 5 minutes in a nitrogen atmosphere, and the temperature is decreased to 30° C. at a scanning rate of −10° C./min.

(Melt Flow Rate)

The melt flow rate (MFR) of the polypropylene homopolymer is preferably 4.0 to 30 g/10 minutes, more preferably 5.0 to 25 g/10 minutes, further preferably 6.0 to 22 g/10 minutes, particularly preferably 7.0 to 20 g/10 minutes, and most preferably 8.0 to 20 g/10 minutes, when being measured according to the condition M (230° C., 2.16 kgf) of JIS K 7210 (1995).

When the melt flow rate (MFR) of the polypropylene homopolymer is not lower than 4.0 g/10 minutes, a biaxially oriented polypropylene film having low heat shrinkage is easily obtained.

Moreover, when the melt flow rate (MFR) of the polypropylene homopolymer is not higher than 30 g/10 minutes, the film formability is easily maintained.

From the viewpoint of film characteristics, the lower limit of the melt flow rate (MFR) (230° C., 2.16 kgf) of the polypropylene homopolymer is preferably 5.0 g/10 minutes, more preferably 5.5 g/10 minutes, further preferably 6.0 g/10 minutes, particularly preferably 6.3 g/10 minutes, and most preferably 6.5 g/10 minutes.

When the melt flow rate (MFR) of the polypropylene homopolymer is not lower than 5.0 g/10 minutes, the amount of a low-molecular-weight component of the polypropylene homopolymer included in the film is increased. Thus, by adopting a width-direction stretching step in a later-described film formation process, in addition to further promoting orientation crystallization of the polypropylene homopolymer and making it easy to further increase the degree of crystallinity in the film, the polypropylene molecular chains in the amorphous part are less entangled with each other, so that the heat resistance is easily increased further.

In order to set the melt flow rate (MFR) of the polypropylene homopolymer to be in the above range, a method in which the average molecular weight or molecular weight distribution of the polypropylene resin is controlled, etc., are preferably adopted.

That is, the lower limit of the amount of a component having a molecular weight of 100,000 or less in GPC integration curve of the polypropylene homopolymer is 35% by mass, preferably 38% by mass, more preferably 40% by mass, further preferably 41% by mass, and particularly preferably 42% by mass.

The upper limit of the amount of the component having a molecular weight of 100,000 or less in the GPC integration curve is preferably 65% by mass, more preferably 60% by mass, and further preferably 58% by mass. When the amount of the component having a molecular weight of 100,000 or less in the GPC integration curve is not larger than 65% by mass, the film strength is less likely to be decreased.

At this time, when a high-molecular-weight component or a long-chain branched component having a long relaxation time is contained, it is easy to adjust the amount of the component having a molecular weight of 100,000 or less contained in the polypropylene homopolymer without significantly changing the overall viscosity. Therefore, it is easy to improve the film-formability without significantly affecting the stiffness and heat shrinkage.
(Molecular Weight Distribution)

The lower limit of mass-average molecular weight (Mw)/number-average molecular weight (Mn), which is an index of the width of the molecular weight distribution, of the polypropylene homopolymer is preferably 3.5, more preferably 4, further preferably 4.5, and particularly preferably 5. The upper limit of the Mw/Mn is preferably 30, more preferably 25, further preferably 23, particularly preferably 21, and most preferably 20.

The Mw/Mn can be obtained by using a gel permeation chromatography (GPC). When the Mw/Mn is in the above range, it is easy to increase the amount of the component having a molecular weight of 100,000 or less.

The molecular weight distribution of the polypropylene homopolymer can be adjusted by polymerizing components having different molecular weights in multiple stages in a series of plants, blending components having different molecular weights offline with a kneader, blending catalysts having different performances and performing polymerization, or using a catalyst capable of achieving a desired molecular weight distribution. As for the shape of the molecular weight distribution obtained by GPC, the molecular weight distribution may be a gentle molecular weight distribution having a single peak, or may be a molecular weight distribution having a plurality of peaks and shoulders, in a GPC chart in which the logarithm of molecular weight (M) (log M) is plotted on the horizontal axis and a differential distribution value (weight fraction per log M) is plotted on the vertical axis.
(Copolymer of Propylene and Ethylene and/or α-Olefin Having 4 or More Carbon Atoms)

The copolymer of propylene and ethylene and/or an α-olefin having 4 or more carbon atoms which is used for the intermediate layer (B) is preferably a copolymer of propylene and ethylene and/or an α-olefin having 4 or more carbon atoms in which the amount of ethylene and/or an α-olefin component having 4 or more carbon atoms exceeds 0.3 mol %.

The copolymer of propylene and ethylene and/or an α-olefin having 4 or more carbon atoms in which the amount of ethylene and/or an α-olefin component having 4 or more carbon atoms exceeds 0.3 mol % preferably has low crystallinity, and examples of other α-olefins include ethylene, 1-butene, 1-pentene, 3-methylpentene-1, 3-methylbutene-1, 1-hexene, 4-methylpentene-1, 5-ethylhexene-1, 1-octene, 1-decene, 1-dodecene, 1-tetradecene, 1-hexadecene, 1-heptadecene, 1-octadecene, and 1-eicosene.

The amount of ethylene and/or an α-olefin having 4 or more carbon atoms is preferably not smaller than 0.4 mol % and more preferably not smaller than 0.6 mol %. When this amount is in the above range, the crystallinity tends to decrease.

Here, the copolymer is preferably a random or block copolymer obtained by polymerizing one or more of the α-olefins exemplified above with propylene, and is preferably a propylene/ethylene copolymer, a propylene/butene-1 copolymer, a propylene/ethylene/butene-1 copolymer, or a propylene/pentene-1 copolymer.

Among copolymers of propylene and ethylene and/or an α-olefin having 4 or more carbon atoms, a copolymer having a lowest DSC melting point and a melting point peak temperature of not lower than 150° C. and not higher than 160° C. is preferable.

The content of the copolymer of propylene and ethylene and/or an α-olefin having 4 or more carbon atoms in which the amount of ethylene and/or an α-olefin component having 4 or more carbon atoms exceeds 0.3 mol %, with respect to the entire polypropylene resin used for the intermediate layer (B), is preferably not larger than 45% by weight, more preferably not smaller than 5% by weight and not larger than 45% by weight, further preferably not smaller than 8% by weight and not larger than 40% by weight, and particularly preferably not smaller than 8% by weight and not larger than 35% by weight.
(Polypropylene Resin Composition)

The ratio of the α-olefin monomer-derived component to the total of the propylene monomer-derived component and the α-olefin monomer-derived component of the entire polypropylene resin composition used for the intermediate layer (B) is preferably not lower than 0.03 mol % and not higher than 0.4 mol %, more preferably not lower than 0.04 mol % and not higher than 0.3 mol %, and further preferably not lower than 0.05 mol % and not higher than 0.2 mol %.

The isotactic mesopentad fraction of the entire polypropylene resin composition for forming the intermediate layer (B) is preferably not lower than 95% from the viewpoint of stiffness. In addition, the isotactic mesopentad fraction is preferably not higher than 99.5% from the viewpoint of film formability.

Moreover, the melt flow rate (MFR) of the polypropylene resin composition used for the intermediate layer (B) is preferably not lower than 5.0 g/10 min from the viewpoint of fusion sealability. By so setting, both stiffness and heat resistance at high temperature can be achieved at a higher level. The melt flow rate is more preferably not lower than 6.0 g/10 min, particularly preferably not lower than 7.0 g/10 min, and most preferably not lower than 8.0 g/10 min.
(Antistatic Agent)

When a specific amine ester compound, a specific amine compound, and a specific glycerol mono-fatty acid ester compound are used in combination in specific proportions for the propylene resin composition for forming the intermediate layer (B), antistatic properties can be improved.

For example, with respect to 100 parts by weight of the polypropylene resin composition for forming the intermediate layer (B), 0.3 to 1.2 parts by weight of a polyoxyethylene alkylamine mono-fatty acid ester compound (A) in which 2 or more moles of ethylene oxide is added to 1 mole of an amine represented by formula (1),

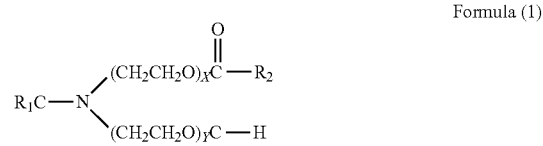

Formula (1)

wherein $R_1$ and $R_2$ are each an alkyl group having 7 to 21 carbon atoms, X and Y are each an integer from 1 to 29, and X+Y is an integer from 2 to 30, 0.03 to 1.2 parts by weight of a glycerol mono-fatty acid ester compound (B) represented by formula (2),

Formula (2)

wherein $R_3$ is an alkyl or an alkenyl group having 7 to 21 carbon atoms, 0 to 0.2 parts by weight of a polyoxyethylene alkylamine di-fatty acid ester compound (C) in which 2 or more moles of ethylene oxide is added to 1 mole of an amine represented by formula (3),

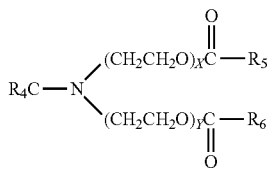

Formula (3)

wherein $R_4$, $R_5$, and $R_6$ are each an alkyl group having 7 to 21 carbon atoms, X and Y are each an integer from 1 to 29, and X+Y is an integer from 2 to 30, and 0 to 0.2 parts by weight of a polyoxyethylene alkenylamine compound (D) in which 2 or more moles of ethylene oxide is added to 1 mole of an amine represented by formula (4),

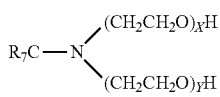

Formula (4)

wherein $R_7$ is an alkenyl group having 7 to 21 carbon atoms, X and Y are each an integer from 1 to 29, and X+Y is an integer from 2 to 30, are preferably contained.

The polyoxyethylene amine monoester compound (A) which is used in the present invention and in which 2 moles of ethylene oxide is added to 1 mole of an amine is a nonionic antistatic agent represented by formula (1), and is contained in a proportion of preferably 0.3 to 1.2 parts by weight and particularly preferably 0.3 to 1.1 parts by weight with respect to 100 parts by weight of the polypropylene-based resin composition for forming the intermediate layer (B). When the content of the compound (A) is not smaller than 0.3 parts by weight, an antistatic effect can be obtained over a long period of time. When the content of the compound (A) is not larger than 1.2 parts by weight, the amount of bleed is small, so that a decrease in transparency due to whitening is small.

The glycerol mono-fatty acid ester compound (B) which is used in the present invention is a nonionic antistatic agent represented by formula (2), R3 is a linear or branched alkyl group, preferably an alkyl group having 10 to 21 carbon atoms, and particularly preferably an alkyl group having 14 to 20 carbon atoms, and the compound (B) is contained in a proportion of preferably 0.03 to 0.3 parts by weight and particularly preferably 0.03 to 0.2 parts by weight with respect to 100 parts by weight of the polypropylene resin composition for forming the intermediate layer (B). When the content of the compound (E) is not smaller than 0.03 parts by weight, antistatic properties are quickly developed and an antistatic effect is obtained. When the content of the compound (E) is not larger than 1.2 parts by weight, the amount of bleed is small, so that adhesiveness on the film surface is less likely to occur and a decrease in transparency due to whitening is small.

The polyoxyethylene alkyl diethanolamine compound (C) which is used in the present invention and in which 2 or more moles of ethylene oxide is added to 1 mole of an amine is a nonionic antistatic agent represented by formula (3), and is contained in a proportion of preferably 0 to 0.2 parts by weight and particularly preferably 0.002 to 0.15 parts by weight with respect to 100 parts by weight of the polypropylene resin composition for forming the intermediate layer (B). When the content of the compound (C) is not larger than 0.2 parts by weight, the amount of bleed is small, so that a decrease in transparency due to whitening is small.

The polyoxyethylene alkenyl diethanolamine compound (D) which is used in the present invention and in which 2 or more moles of ethylene oxide is added to 1 mole of an amine is a nonionic antistatic agent represented by formula (4), and is contained in a proportion of preferably 0 to 0.2 parts by weight and particularly preferably 0.002 to 0.15 parts by weight with respect to 100 parts by weight of the polypropylene resin composition for forming the intermediate layer (B). When the content of the compound (C) is not larger than 0.2 parts by weight, the amount of bleed is small, so that a decrease in transparency due to whitening is small.

In formulas (1) to (4), X and Y are each an integer from 1 to 29, and X+Y is an integer from 2 to 30 and preferably an integer from 2 to 4.

R1 is a linear or branched alkyl group, particularly preferably an alkyl group having 13 to 25 carbon atoms, and particularly preferably an alkyl group having 13 to 18 carbon atoms.

Specific examples of the alkyl groups as R1 to R6 in formulas (1) to (3) include a methyl group, an ethyl group, a propyl group, a butyl group, an isobutyl group, a t-butyl group, a pentyl group, an isopentyl group, a nonyl group, a decyl group, an undecyl group, a lauryl group, a trilauryl group, a myristyl group, a pentadecyl group, a palmityl group, a heptadecyl group, a stearyl group, a nonadecyl group, and an eicosyl group.

The alkenyl group as R7 in formula (4) is preferably at least one group selected from higher unsaturated aliphatic groups having 12 to 21 carbon atoms.

Moreover, as long as the effects of the present invention are not impaired, various additives for improving the quality such as slipperiness, for example, lubricants such as wax and metallic soap, plasticizers, and processing aids for improving the productivity, and known heat stabilizers, antioxidants, and UV absorbers which are normally added to a polypropylene-based film, etc., can also be blended into the polypropylene-based resin composition for forming the intermediate layer (B).

(Surface Layer (C))
(Polypropylene Resin)

When a later-described polypropylene homopolymer and a later-described copolymer of propylene and ethylene and/or an α-olefin having 4 or more carbon atoms are used for a polypropylene resin composition used for the surface layer (C) of the biaxially oriented polypropylene film of the present invention, the lamination strength is easily improved while the stiffness is maintained.

(Polypropylene Homopolymer)

As the polypropylene homopolymer used in the surface layer (C), a polypropylene homopolymer that substantially does not contain ethylene and/or an α-olefin having 4 or more carbon atoms is preferable. Even in the case where ethylene and/or an α-olefin component having 4 or more carbon atoms is contained, the amount of the ethylene and/or the α-olefin component having 4 or more carbon atoms is preferably not larger than 0.3 mol %, more preferably not larger than 0.2 mol %, and further preferably not larger than 0.1 mol. When the amount of the component is in the above range, the crystallinity is likely to be improved.

Examples of the α-olefin component having 4 or more carbon atoms and included in such a copolymer include 1-butene, 1-pentene, 3-methylpentene-1, 3-methylbutene-1, 1-hexene, 4-methylpentene-1, 5-ethylhexene-1, 1-octene, 1-decene, 1-dodecene, 1-tetradecene, 1-hexadecene, 1-heptadecene, 1-octadecene, and 1-eicosene.

As the polypropylene homopolymer, two or more different polypropylene homopolymers can be used.

The content of the propylene homopolymer, with respect to the entire polypropylene-based resin used for the surface layer (C), is preferably not larger than 90% by weight, more preferably not smaller than 40% by weight and not larger than 90% by weight, further preferably not smaller than 50% by weight and not larger than 80% by weight, and particularly preferably not smaller than 60% by weight and not larger than 70% by weight.

(Stereoregularity)

The mesopentad fraction ([mmmm]%), which is an index of the stereoregularity of the polypropylene homopolymer, is preferably in the range of 97.0 to 99.9%, more preferably in the range of 97.5 to 99.7%, further preferably in the range of 98.0 to 99.5%, and particularly preferably in the range of 98.5 to 99.3%.

When the mesopentad fraction is not lower than 97.0%, the crystallinity of the polypropylene resin is increased, the melting point, the degree of crystallinity, and the degree of crystal orientation of crystals in the film are improved, and stiffness and heat resistance at high temperature are easily ensured. When the mesopentad fraction is not higher than 99.9%, the cost can be easily reduced in terms of polypropylene production, and breaking is less likely to occur during film formation. The mesopentad fraction is measured by a nuclear magnetic resonance method (so-called NMR method).

The mesopentad fraction is more preferably not higher than 99.5%. The mesopentad fraction is measured by a nuclear magnetic resonance method (so-called NMR method).

In order to set the mesopentad fraction of the polypropylene homopolymer to be in the above range, a method in which the obtained polypropylene homopolymer powder is washed with a solvent such as n-heptane, a method in which selection of a catalyst and/or co-catalyst and selection of components of the polypropylene resin composition are made as appropriate, etc., are preferably adopted.

(Melting Temperature)

The lower limit of the melting temperature (Tm) of the polypropylene homopolymer measured by a DSC is preferably 160° C., more preferably 161° C., further preferably 162° C., even further preferably 163° C., and further preferably 164° C. When the Tm is not lower than 160° C., stiffness and heat resistance at high temperature are easily ensured. The upper limit of the Tm is preferably 170° C., more preferably 169° C., further preferably 168° C., even further preferably 167° C., and particularly preferably 166° C. When the Tm is not higher than 170° C., an increase in cost is easily suppressed in terms of polypropylene production, and breaking is less likely to occur during film formation. The melting temperature can be further increased by blending a crystal nucleating agent into the above-described polypropylene homopolymer.

The Tm is measured by a differential scanning calorimeter (DSC), and the Tm is the main peak temperature of an endothermic peak associated with melting that is observed when 1 to 10 mg of a sample is put into an aluminum pan, the aluminum pan is set in a differential scanning calorimeter (DSC), the sample is melted at 230° C. for 5 minutes in a nitrogen atmosphere, the temperature is decreased to 30° C. at a scanning rate of −10° C./min, then the sample is retained for 5 minutes, and the temperature is increased at a scanning rate of 10° C./min.

(Crystallization Temperature)

The lower limit of the crystallization temperature (Tc) of the polypropylene homopolymer is 105° C., preferably 108° C., and more preferably 110° C. When the Tc is not lower than 105° C., crystallization easily proceeds in stretching in a width direction and a subsequent cooling step, so that stiffness and heat resistance at high temperature are easily ensured. The upper limit of the Tc is preferably 135° C., more preferably 133° C., further preferably 132° C., even further preferably 130° C., particularly preferably 128° C., and most preferably 127° C. When the Tc is not higher than 135° C., an increase in cost is easily suppressed in terms of polypropylene production, and breaking is less likely to occur during film formation. The crystallization temperature can be further increased by blending a crystal nucleating agent into the above-described polypropylene homopolymer.

The Tc is measured by a differential scanning calorimeter (DSC), and the Tc is the main peak temperature of an exothermic peak that is observed when 1 to 10 mg of a sample is put into an aluminum pan, the aluminum pan is set in DSC, the sample is melted at 230° C. for 5 minutes in a nitrogen atmosphere, and the temperature is decreased to 30° C. at a scanning rate of −10° C./min.

(Melt Flow Rate)

The MFR of the polypropylene homopolymer is preferably 4.0 to 30 g/10 minutes, more preferably 4.5 to 25 g/10 minutes, further preferably 4.8 to 22 g/10 minutes, particularly preferably 5.0 to 20 g/10 minutes, and most preferably 6.0 to 20 g/10 minutes, when being measured according to the condition M (230° C., 2.16 kgf) of JIS K 7210 (1995).

When the MFR of the polypropylene resin is not lower than 4.0 g/10 minutes, a biaxially oriented polypropylene film having low heat shrinkage is easily obtained.

Moreover, when the MFR of the polypropylene resin is not higher than 30 g/10 minutes, the film formability is easily maintained.

From the viewpoint of film characteristics, the lower limit of the MFR (230° C., 2.16 kgf) of the polypropylene homopolymer is preferably 5.0 g/10 minutes, more preferably 5.5 g/10 minutes, further preferably 6.0 g/10 minutes, particularly preferably 6.3 g/10 minutes, and most preferably 6.5 g/10 minutes.

When the MFR of the polypropylene homopolymer is not lower than 5.0 g/10 minutes, the amount of a low-molecular-weight component of the polypropylene homopolymer included in the film is increased. Thus, by adopting a width-direction stretching step in a later-described film formation process, in addition to further promoting orientation crystallization of the polypropylene resin and making it easy to further increase the degree of crystallinity in the film, the polypropylene molecular chains in the amorphous part are less entangled with each other, so that the heat resistance is easily increased further.

In order to set the MFR of the polypropylene homopolymer to be in the above range, a method in which the average molecular weight or molecular weight distribution of the polypropylene resin is controlled, etc., are preferably adopted.

That is, the lower limit of the amount of a component having a molecular weight of 100,000 or less in gel permeation chromatography (GPC) integration curve of the polypropylene homopolymer is 35% by mass, preferably 38% by mass, more preferably 40% by mass, further preferably 41% by mass, and particularly preferably 42% by mass.

The upper limit of the amount of the component having a molecular weight of 100,000 or less in the GPC integration curve is preferably 65% by mass, more preferably 60% by mass, and further preferably 58% by mass. When the amount of the component having a molecular weight of 100,000 or less in the GPC integration curve is not larger than 65% by mass, the film strength is less likely to be decreased.

At this time, when a high-molecular-weight component or a long-chain branched component having a long relaxation time is contained, it is easy to adjust the amount of the component having a molecular weight of 100,000 or less contained in the polypropylene homopolymer without significantly changing the overall viscosity. Therefore, it is easy to improve the film-formability without significantly affecting the stiffness and heat shrinkage.

(Molecular Weight Distribution)

The lower limit of mass-average molecular weight (Mw)/number-average molecular weight (Mn), which is an index of the width of the molecular weight distribution, of the polypropylene homopolymer is preferably 3.5, more preferably 4, further preferably 4.5, and particularly preferably 5. The upper limit of the Mw/Mn is preferably 30, more preferably 25, further preferably 23, particularly preferably 21, and most preferably 20.

The Mw/Mn can be obtained by using a gel permeation chromatography (GPC). When the Mw/Mn is in the above range, it is easy to increase the amount of the component having a molecular weight of 100,000 or less.

The molecular weight distribution of the polypropylene homopolymer can be adjusted by polymerizing components having different molecular weights in multiple stages in a series of plants, blending components having different molecular weights offline with a kneader, blending catalysts having different performances and performing polymerization, or using a catalyst capable of achieving a desired molecular weight distribution. As for the shape of the molecular weight distribution obtained by GPC, the molecular weight distribution may be a gentle molecular weight distribution having a single peak, or may be a molecular weight distribution having a plurality of peaks and shoulders, in a GPC chart in which the logarithm of molecular weight (M) (log M) is plotted on the horizontal axis and a differential distribution value (weight fraction per log M) is plotted on the vertical axis.

(Copolymer of Propylene and Ethylene and/or α-Olefin Having 4 or More Carbon Atoms)

The copolymer of propylene and ethylene and/or an α-olefin having 4 or more carbon atoms which is used for the surface layer (C) is preferably a copolymer of propylene and ethylene and/or an α-olefin having 4 or more carbon atoms in which the amount of ethylene and/or an α-olefin component having 4 or more carbon atoms exceeds 0.3 mol.

The copolymer of propylene and ethylene and/or an α-olefin having 4 or more carbon atoms in which the amount of ethylene and/or an α-olefin component having 4 or more carbon atoms exceeds 0.3 mol preferably has low crystallinity, and examples of other α-olefins include ethylene, 1-butene, 1-pentene, 3-methylpentene-1, 3-methylbutene-1, 1-hexene, 4-methylpentene-1, 5-ethylhexene-1, 1-octene, 1-decene, 1-dodecene, 1-tetradecene, 1-hexadecene, 1-heptadecene, 1-octadecene, and 1-eicosene.

The amount of ethylene and/or an α-olefin having 4 or more carbon atoms is preferably not smaller than 0.4 mol % and more preferably not smaller than 0.5 mol %. When this amount is in the above range, the crystallinity tends to decrease.

Here, the copolymer is preferably a random or block copolymer obtained by polymerizing one or more of the α-olefins exemplified above with propylene, and is preferably a propylene/ethylene copolymer, a propylene/butene-1 copolymer, a propylene/ethylene/butene-1 copolymer, or a propylene/pentene-1 copolymer.

Among copolymers of propylene and ethylene and/or an α-olefin having 4 or more carbon atoms, a copolymer having a lowest DSC melting point and a melting point peak temperature of not lower than 150° C. and not higher than 160° C. is preferable.

The content of the copolymer of propylene and ethylene and/or an α-olefin having 4 or more carbon atoms in which the amount of ethylene and/or an α-olefin component having 4 or more carbon atoms exceeds 0.3 mol, with respect to the entire polypropylene resin used for the surface layer (C), is preferably not smaller than 10% by weight, more preferably not smaller than 10% by weight and not larger than 60% by weight, further preferably not smaller than 20% by weight and not larger than 50% by weight, and particularly preferably not smaller than 30% by weight and not larger than 50% by weight.

(Polypropylene-Based Resin Composition)

The ratio of the α-olefin monomer-derived component to the total of the propylene monomer-derived component and the α-olefin monomer-derived component of the entire polypropylene resin composition used for the surface layer (C) is preferably not lower than 0.10 mol % and not higher than 0.4 mol %, more preferably not lower than 0.15 mol % and not higher than 0.2 mol %, and further preferably not lower than 0.2 mol % and not higher than 0.25 mol %.

The isotactic mesopentad fraction of the entire polypropylene resin composition for forming the surface layer (C) is preferably not lower than 95% from the viewpoint of stiffness. In addition, the isotactic mesopentad fraction is preferably not higher than 99.5% from the viewpoint of film formability.

Moreover, the melt flow rate (MFR) of the polypropylene resin composition used for the surface layer (C) is preferably not lower than 5.0 g/10 min from the viewpoint of fusion sealability. By so setting, both stiffness and heat resistance at high temperature can be achieved at a higher level. The melt flow rate is more preferably not lower than 6.0 g/10 min, particularly preferably not lower than 7.0 g/10 min, and most preferably not lower than 8.0 g/10 min.

(Antistatic Agent)

When a specific amine ester compound, a specific amine compound, and a specific glycerol mono-fatty acid ester compound are used in combination in specific proportions for the propylene resin composition for forming the surface layer (C), antistatic properties can be improved.

For example, with respect to 100 parts by weight of the polypropylene resin composition for forming the surface layer (C), 0.3 to 1.2 parts by weight of a polyoxyethylene alkylamine mono-fatty acid ester compound (A) in which 2 or more moles of ethylene oxide is added to 1 mole of an amine represented by formula (1), Formula (1)

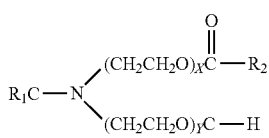

wherein $R_1$ and $R_2$ are each an alkyl group having 7 to 21 carbon atoms, X and Y are each an integer from 1 to 29, and X+Y is an integer from 2 to 30, 0.03 to 1.2 parts by weight of a glycerol mono-fatty acid ester compound (B) represented by the following formula (2), Formula (2)

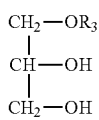

wherein $R_3$ is an alkyl or an alkenyl group having 7 to 21 carbon atoms, 0 to 0.2 parts by weight of a polyoxyethylene alkylamine di-fatty acid ester compound (C) in which 2 or more moles of ethylene oxide is added to 1 mole of an amine represented by the following formula (3), Formula (3)

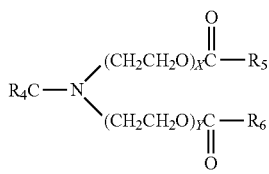

wherein $R_4$, $R_5$, and $R_6$ are each an alkyl group having 7 to 21 carbon atoms, X and Y are each an integer from 1 to 29, and X+Y is an integer from 2 to 30, and 0 to 0.2 parts by weight of a polyoxyethylene alkenylamine compound (D) in which 2 or more moles of ethylene oxide is added to 1 mole of an amine represented by the following formula (4), Formula (4)

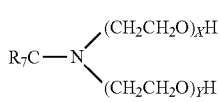

wherein $R_7$ is an alkenyl group having 7 to 21 carbon atoms, X and Y are each an integer from 1 to 29, and X+Y is an integer from 2 to 30, are preferably contained.

The polyoxyethylene alkylamine mono-fatty acid ester compound (A) which is used in the present invention and in which 2 moles of ethylene oxide is added to 1 mole of an amine is a nonionic antistatic agent represented by formula (1), and is contained in a proportion of preferably 0.3 to 1.2 parts by weight and particularly preferably 0.3 to 1.1 parts by weight with respect to 100 parts by weight of the polypropylene-based resin composition for forming the surface layer (C). When the content of the compound (A) is not smaller than 0.3 parts by weight, an antistatic effect can be obtained over a long period of time. When the content of the compound (A) is not larger than 1.2 parts by weight, the amount of bleed is small, so that a decrease in transparency due to whitening is small.

The glycerol mono-fatty acid ester compound (B) which is used in the present invention is a nonionic antistatic agent represented by formula (2), R3 is a linear or branched alkyl group, preferably an alkyl group having 10 to 21 carbon atoms, and particularly preferably an alkyl group having 14 to 20 carbon atoms, and the compound (B) is contained in a proportion of preferably 0.03 to 0.3 parts by weight and particularly preferably 0.03 to 0.2 parts by weight with respect to 100 parts by weight of the polypropylene resin composition for forming the surface layer (C). When the content of the compound (E) is not smaller than 0.03 parts by weight, antistatic properties are quickly developed and an antistatic effect is obtained. When the content of the compound (E) is not larger than 1.2 parts by weight, the amount of bleed is small, so that adhesiveness on the film surface is less likely to occur and a decrease in transparency due to whitening is small.

The polyoxyethylene alkylamine di-fatty acid ester compound (C) which is used in the present invention and in which 2 or more moles of ethylene oxide is added to 1 mole of an amine is a nonionic antistatic agent represented by formula (3), and is contained in a proportion of preferably 0 to 0.2 parts by weight and particularly preferably 0.002 to 0.15 parts by weight with respect to 100 parts by weight of the polypropylene resin composition for forming the surface layer (C). When the content of the compound (C) is not larger than 0.2 parts by weight, the amount of bleed is small, so that a decrease in transparency due to whitening is small.

The polyoxyethylene alkenylamine compound (D) which is used in the present invention and in which 2 or more moles of ethylene oxide is added to 1 mole of an amine is a nonionic antistatic agent represented by formula (4), and is contained in a proportion of preferably 0 to 0.2 parts by weight and particularly preferably 0.002 to 0.15 parts by weight with respect to 100 parts by weight of the polypropylene resin composition for forming the surface layer (C). When the content of the compound (D) is not larger than 0.2 parts by weight, the amount of bleed is small, so that a decrease in transparency due to whitening is small.

In formulas (1) to (4), X and Y are each an integer from 1 to 29, and X+Y is an integer from 2 to 30 and preferably an integer from 2 to 4.

R1 is a linear or branched alkyl group, particularly preferably an alkyl group having 13 to 25 carbon atoms, and particularly preferably an alkyl group having 13 to 18 carbon atoms.

Specific examples of the alkyl groups as R1 to R6 in formulas (1) to (3) include a methyl group, an ethyl group, a propyl group, a butyl group, an isobutyl group, a t-butyl group, a pentyl group, an isopentyl group, a nonyl group, a decyl group, an undecyl group, a lauryl group, a trilauryl group, a myristyl group, a pentadecyl group, a palmityl group, a heptadecyl group, a stearyl group, a nonadecyl group, and an eicosyl group.

The alkenyl group as R7 in formula (4) is preferably at least one group selected from higher unsaturated aliphatic groups having 12 to 21 carbon atoms.

Moreover, as long as the effects of the present invention are not impaired, various additives for improving the quality such as slipperiness, for example, lubricants such as wax and metallic soap, plasticizers, and processing aids for improving the productivity, and known heat stabilizers, antioxidants, UV absorbers, inorganic fine particles, and organic fine particles, which are normally added to a polypropylene-based film, etc., can also be blended into the polypropylene-based resin composition for forming the surface layer (C).

Examples of the inorganic fine particles include silicon dioxide, calcium carbonate, titanium dioxide, talc, kaolin, mica, and zeolite. The shapes of these particles may be any shapes such as spherical, elliptical, conical, or irregular shapes. As for the diameter of the particles, particles having a desired diameter depending on the application and usage method of the film can also be used and blended.

Moreover, as the organic fine particles, cross-linked particles of acrylic, methyl acrylate, and styrene-butadiene, or the like can be used. As for the shape and the size thereof, similar to the inorganic fine particles, various particles can be used. In addition, various surface treatments can be performed on the surfaces of these inorganic or organic fine particles, and these particles can be used individually or two or more types thereof can be used in combination. The above also applies to the surface layer (B) described later.

(Film Layer Configuration)

The biaxially oriented polypropylene-based film of the present invention may have a three-layer structure of base layer (A)/intermediate layer (B)/surface layer (C), a four-layer structure of surface layer (C)/base layer (A)/intermediate layer (B)/surface layer (C), or a six-layer structure of surface layer (C)/intermediate layer (B)/base layer (A)/intermediate layer (B)/surface layer (C).

(Film Thickness)

The total layer thickness of the biaxially oriented polypropylene-based resin film of the present invention differs depending on the application and usage method thereof, and from the viewpoint of film strength, or sealability or water vapor barrier properties, the total layer thickness is preferably not smaller than 10 μm, more preferably not smaller than 15 μm, and further preferably not smaller than 20 μm.

In terms of high-speed packaging processability or visibility, the total layer thickness is preferably not larger than 60 μm, further preferably not larger than 50 μm, particularly preferably not larger than 45 μm, and most preferably not larger than 40 μm.

The thickness of the base layer (A) differs depending on the application and usage method thereof, and is preferably not smaller than 10 μm in terms of the stiffness and water vapor barrier properties of the film. In terms of transparency and environmental impact, the thickness of the base layer (A) is preferably not larger than 50 μm, more preferably not larger than 45 μm, further preferably not larger than 40 μm, and particularly preferably not larger than 37 μm.

The thickness of the intermediate layer (B) differs depending on the application and usage method thereof, and in terms of the lamination strength and the antistatic properties of the film, the thickness of the intermediate layer (B) is preferably not smaller than 1 μm, more preferably not smaller than 2 μm, and further preferably not smaller than 4 μm.

The thickness of the intermediate layer (B) differs depending on the application and usage method thereof, and in terms of the stiffness and heat resistance at high temperature of the film, the thickness of the intermediate layer (B) is preferably not larger than 8 μm and more preferably not larger than 6 μm.

From the viewpoint of stiffness and heat resistance at high temperature, the ratio of the thickness of the intermediate layer (B) to the total layer thickness of the biaxially oriented polypropylene-based resin film is preferably not lower than 5%, more preferably not lower than 10%, and further preferably not lower than 15%.

From the viewpoint of stiffness and heat resistance at high temperature, the ratio of the thickness of the intermediate layer (B) to the total layer thickness of the biaxially oriented polypropylene-based resin film is preferably not higher than 30% and more preferably not higher than 25%.

The thickness of the surface layer (C) differs depending on the application and usage method thereof, and in terms of the lamination strength and the antistatic properties of the film, the thickness of the surface layer (C) is preferably not smaller than 0.3 μm, more preferably not smaller than 0.5 μm, and further preferably not smaller than 0.8 μm.

The thickness of the surface layer (C) differs depending on the application and usage method thereof, and in terms of the stiffness and the heat resistance at high temperature of the film, the thickness of the surface layer (C) is preferably not larger than 4 μm and more preferably not larger than 3 μm.

From the viewpoint of stiffness and heat resistance at high temperature, the ratio of the thickness of the surface layer (C) to the total layer thickness of the biaxially oriented polypropylene-based resin film is preferably not lower than 2%, more preferably not lower than 3%, and further preferably not lower than 4%.

From the viewpoint of stiffness and heat resistance at high temperature, the ratio of the thickness of the surface layer (C) to the total layer thickness of the biaxially oriented polypropylene-based resin film is preferably not higher than 20% and more preferably not higher than 15%.

(Method for Forming Biaxially Oriented Polypropylene Film)

The biaxially oriented polypropylene film of the present invention can be preferably obtained by producing an unstretched sheet made of the polypropylene resin composition containing the above-described polypropylene resin as a main component, and biaxially stretching the unstretched sheet. As the method for the biaxial stretching, any of an inflation simultaneous biaxial stretching method, a tenter simultaneous biaxial stretching method, and a tenter sequential biaxial stretching method can be adopted, but a tenter sequential biaxial stretching method is preferably adopted from the viewpoint of film formation stability and thickness uniformity. In particular, stretching is preferably performed in a width direction after stretching in a longitudinal direction, but a method in which stretching is performed in the longitudinal direction after stretching in the width direction may be adopted.

Next, a method for producing the biaxially oriented polypropylene film of the present invention will be described below, but the present invention is not necessarily limited thereto.

Hereinafter, the case where a tenter sequential biaxial stretching method is adopted for the case of surface layer (C)/intermediate layer (B)/base layer (A)/intermediate layer (B)/surface layer (C) will be described.

First, a molten polypropylene resin composition multi-layer sheet having a configuration of surface layer (C)/intermediate layer (B)/base layer (A)/intermediate layer (B)/surface layer (C) is extruded from a T-die.

As the method therefor, for example, a method, in which co-extrusion is performed while thermoplastic resins sent from different flow passages using six extruders are stacked in multiple layers using a multilayer feed block, a static mixer, a multilayer multi-manifold die, or the like, can be used.

It is also possible to use only one extruder and introduce the above-described multilayer device in a melt line from the extruder to the T-die.

From the viewpoint of stabilizing back pressure and suppressing thickness variation, a method in which a gear pump is installed on a polymer flow passage is preferable.

The molten sheet co-extruded from the T-die in sheet form is brought into contact with a metal cooling roll to be cooled and solidified. To accelerate the solidification, the sheet cooled by the cooling roll is preferably further cooled by, for example, immersing the sheet in a water bath.

Then, the sheet is stretched in the longitudinal direction with two pairs of heated stretching rolls by increasing the number of rotations of the rear stretching rolls, to obtain a uniaxially stretched film.

Subsequently, the uniaxially stretched film is preheated, and then stretched in the width direction at a specific temperature, while grasping an end portion of the film, by a tenter type stretching machine to obtain a biaxially stretched film. This width-direction stretching step will be described in detail later.

After the width-direction stretching step is completed, the biaxially stretched film is heat-treated at a specific temperature to obtain a biaxially oriented film. In the heat treatment step, the film may be relaxed in the width direction.

The biaxially oriented polypropylene film thus obtained can be subjected to, for example, a corona discharge treatment on at least one surface thereof as necessary, and then wound by a winder to obtain a film roll.

Each step will be described in detail below.
(Extrusion Step)

The temperature of the cooling roll or the temperatures of the cooling roll and the water tank are preferably in the range of 10° C. to the Tc. In the case of increasing the transparency of the film, the sheet is preferably cooled and solidified by a cooling roll set at a temperature in the range of 10 to 50° C. When the cooling temperature is not higher than 50° C., the transparency of the unstretched sheet is likely to be increased, and the cooling temperature is preferably not higher than 40° C. and further preferably not higher than 30° C. In order to increase the degree of crystal orientation after the sequential biaxial stretching, it may be preferable to set the cooling temperature to be 40° C. or higher. However, in the case of using a propylene homopolymer having a meso-pentad fraction of 97.0% or higher as described above, the cooling temperature is preferably not higher than 40° C., for facilitating stretching in the next step and reducing the thickness unevenness, and more preferably not higher than 30° C.

The thickness of the unstretched sheet is preferably not larger than 3500 μm in terms of cooling efficiency, is further preferably not larger than 3000 μm, and can be adjusted as appropriate in accordance with the film thickness after the sequential biaxial stretching. The thickness of the unstretched sheet can be controlled on the basis of the extrusion speed of the polypropylene resin composition, the lip width of the T-die, etc.

(Longitudinal-Direction Stretching Step)

The lower limit of a longitudinal-direction stretching ratio is 3 times, more preferably 3.5 times, and particularly preferably 3.8 times. When the longitudinal-direction stretching ratio is in the above range, the strength is easily increased, and the film thickness unevenness is also reduced. The upper limit of the longitudinal-direction stretching ratio is preferably 8 times, more preferably 7.5 times, and particularly preferably 7 times. When the longitudinal-direction stretching ratio is in the above range, stretching is easily performed in the width direction in the width-direction stretching step, so that the productivity is improved.

The lower limit of the longitudinal-direction stretching temperature is preferably Tm−40° C., more preferably Tm−37° C., and further preferably Tm−35° C. Tm is a melting point of polypropylene homopolymer constituting the base layer. When the longitudinal-direction stretching temperature is in the above range, stretching in the width direction that is subsequently performed becomes easy, and the thickness unevenness is also reduced. The upper limit of the longitudinal-direction stretching temperature is preferably Tm−7° C., more preferably Tm−10° C., and further preferably Tm−12° C. When the longitudinal-direction stretching temperature is in the above range, the heat shrinkage rate is easily decreased, so that the stretching does not become difficult due to adhesion to the stretching rolls, or the quality is not decreased due to an increase in surface roughness.

As for the stretching in the longitudinal direction, three or more pairs of stretching rolls may be used to perform stretching in multiple stages which are two or more stages.
(Preheating Step)

Before the width-direction stretching step, the uniaxially stretched film after the stretching in the longitudinal direction needs to be heated in the range of Tm to Tm+25° C. to soften the polypropylene resin composition. When the preheating temperature is set to be not lower than Tm, softening proceeds and the stretching in the width direction becomes easy. When the preheating temperature is set to be not higher than Tm+25° C., stiffness is easily ensured and the orientation at the time of lateral stretching proceeds. The preheating temperature is more preferably Tm+2 to Tm+22° C. and particularly preferably Tm+3 to Tm+20° C. Here, the maximum temperature in the preheating step is defined as the preheating temperature.
(Width-Direction Stretching Step)

A preferable method for the width-direction stretching step after the preheating step is as follows.

In the width-direction stretching step, a section (first term section) in which stretching is performed at a temperature that is not lower than Tm−10° C. and not higher than the preheating temperature is provided. At this time, the start time of the first term section may be the time when the preheating temperature is reached, or may be the time when the temperature is decreased to reach a temperature lower than the preheating temperature after the preheating temperature is reached.

The lower limit of the temperature in the first term section in the width-direction stretching step is preferably Tm ° C., more preferably Tm+1° C., and further preferably Tm+3° C. When the stretching temperature in the first term section is in this range, shrinkage at high temperatures is easily reduced, the plane orientation coefficient is not too high, and laminate strength is easily improved when the biaxially oriented polypropylene-based film of the present invention has three layer configuration.

Subsequently to the first term section, a section (second term section) in which stretching is performed at a temperature that is lower than the temperature in the first term section and that is not lower than Tm−70° C. and not higher than Tm−5° C. may be provided, or width-direction stretching may be continued at the temperature of the first term section.

The upper limit of the stretching temperature in the second term section is preferably Tm−8° C. and more preferably Tm−10° C. When the stretching temperature in the second term section is in this range, stiffness is easily ensured.

The lower limit of the stretching temperature in the second term section is preferably Tm−65° C., more preferably Tm−60° C., and further preferably Tm−55° C. When the stretching temperature in the second term section is in this range, the film formation is likely to be stabilized.

Preferably, the film is immediately cooled after the width-direction final stretching ratio is reached at the end of the second term section or by continuing width-direction stretching at the temperature of the first term section. The cooling temperature at this time is preferably a temperature that is not higher than the temperature in the second term section and that is not lower than Tm−80° C. and not higher than Tm−15° C., more preferably a temperature that is not lower than Tm−80° C. and not higher than Tm−20° C., further preferably a temperature that is not lower than Tm−80° C. and not higher than Tm−30° C., and particularly preferably a temperature that is not lower than Tm−70° C. and not higher than Tm−40° C.

The temperature in the first term section and the temperature in the second term section can be gradually decreased, but can also be decreased stepwise or in one step, or each may be constant. When the temperatures are gradually decreased, the film is less likely to be broken, and the thickness fluctuation of the film is easily reduced. In addition, the heat shrinkage rate is easily decreased, and the film is less whitened. Thus, it is preferable to gradually decrease the temperatures. In the width-direction stretching step, the temperature can be gradually decreased from the temperature at the end of the first term section to the temperature at the start of the second term section, but can also be decreased stepwise or in one step.

When the second term section is provided, the lower limit of the stretching ratio at the end of the first term section in the width-direction stretching step is preferably 5 times, more preferably 6 times, and further preferably 7 times. The upper limit of the stretching ratio at the end of the first term section is preferably 15 times, more preferably 14 times, and further preferably 13 times.

When the second term section is provided, the lower limit of the final width-direction stretching ratio in the width-direction stretching step is preferably 7 times, more preferably 8 times, further preferably 9 times, and particularly preferably 10 times. When the final width-direction stretching ratio is not less than 7 times, the stiffness is easily increased, and the film thickness unevenness is also easily reduced. The upper limit of the width-direction stretching ratio is preferably 20 times, more preferably 17 times, and further preferably 15 times. When the width-direction stretching ratio is not more than 20 times, the heat shrinkage rate is easily decreased, and the film is less likely to be broken during stretching.

When width-direction stretching is continued at the temperature of the first term section without the second term section, the lower limit of the final width-direction stretching ratio in the width-direction stretching step is preferably 10 times, and more preferably 11 times. When the final width-direction stretching ratio is not less than 10 times, the stiffness is easily increased, and the film thickness unevenness is also easily reduced. The upper limit of the width-direction stretching ratio is preferably 20 times, more preferably 17 times, and further preferably 15 times. When the width-direction stretching ratio is not more than 20 times, the heat shrinkage rate is easily decreased, and the film is less likely to be broken during stretching.

By using the polypropylene resin having high stereoregularity, a high melting point, and high crystallinity as described above and adopting the above-described width-direction stretching step, the molecules of the polypropylene resin are highly aligned in a main orientation direction (corresponding to the width direction in the above-described width-direction stretching step) even without extremely increasing the stretching ratio. Thus, the crystal orientation in the obtained biaxially oriented film is very strong, and crystals having a high melting point are likely to be generated.

Moreover, the orientation of the amorphous part between the crystals is also increased in the main orientation direction (corresponding to the width direction in the above-described width-direction stretching step) and many crystals having a high melting point exist around the amorphous part. Thus, at a temperature lower than the melting point of the crystals, the elongated polypropylene molecules in the amorphous part are less likely to be relaxed and easily maintain its tense state. Therefore, the entire biaxially oriented film can maintain high stiffness even at high temperature.

Also, notably, by adopting such a width-direction stretching step, the heat shrinkage rate at a high temperature of 150° C. is also easily decreased. The reason for this is that since many crystals having a high melting point exist around the amorphous part, the elongated polypropylene resin molecules in the amorphous part are less likely to be relaxed at a temperature lower than the melting point of the crystals, and the molecules are less entangled with each other.

More notably, the reason is also that by increasing the amount of the low-molecular-weight component of the polypropylene resin, the degree of crystallinity of the film is easily increased further, and the entanglement of the polypropylene resin molecular chains in the amorphous part is further reduced to weaken the heat shrinkage stress, whereby the heat shrinkage rate can be further decreased. This can be said to be unprecedented in consideration of the fact that, in the conventional art, when either strength or heat shrinkage rate is improved, the other characteristic tends to decrease.

(Heat Treatment Step)

The biaxially stretched film can be heat-treated as necessary in order to further decrease the heat shrinkage rate. The upper limit of the heat treatment temperature is preferably Tm+10° C. and more preferably Tm+7° C. When the heat treatment temperature is set to be not higher than Tm+10° C., stiffness is easily ensured, the surface roughness of the film does not become too larger, and the film is less likely to be whitened. The lower limit of the heat treatment temperature is preferably Tm−10° C. and more preferably Tm−7° C. When the heat treatment temperature is lower than Tm−10° C., the heat shrinkage rate may be increased.

By adopting the above-described width-direction stretching step, even when heat treatment is performed at a temperature of Tm−10° C. to Tm+10, the highly oriented crystals generated in the stretching step are less likely to be melted, and the heat shrinkage rate can be further decreased without decreasing the stiffness of the obtained film. For the purpose of adjusting the heat shrinkage rate, the film may be relaxed in the width direction during the heat treatment. The upper limit of the relaxation rate is preferably 10%. When the relaxation rate is in the above range, the film strength is less likely to be decreased, and the thickness fluctuation of the film is likely to be reduced. The upper limit of the relaxation rate is more preferably 8%, further preferably 7%, even further preferably 3%, particularly preferably 2%, and most preferably 0%.

(Film Thickness)

The thickness of the biaxially oriented polypropylene film of the present invention is set according to each application, but in order to ensure the strength of the film, the lower limit of the film thickness is preferably 10 μm, more preferably 12 μm, further preferably 14 μm, particularly preferably 16 μm. When the film thickness is not smaller than 2 μm, the stiffness of the film is easily ensured. The upper limit of the film thickness is preferably 100 μm, more preferably 70 μm, further preferably 50 μm, particularly preferably 40 μm, and most preferably 30 μm. When the film thickness is not larger than 100 μm, the cooling rate of the unstretched sheet during the extrusion step is less likely to be decreased.

The biaxially oriented polypropylene film of the present invention is usually formed as a roll having a width of 2000 to 12000 mm and a length of about 1000 to 50000 m, and is wound into a film roll. Furthermore, the biaxially oriented polypropylene film is slit according to each application and is provided as a slit roll having a width of 300 to 2000 mm and a length of about 500 to 5000 m. The biaxially oriented polypropylene film of the present invention can be obtained as a longer film roll.

A surface treatment by a conventionally known method such as a corona discharge treatment, a plasma treatment, an ozone treatment, and a chemical treatment, an anchor treatment using a known anchor treatment agent, etc., may be performed on the antistatic biaxially oriented polypropylene-based resin film used in the present invention, according to the purpose.

In particular, the antistatic properties can be improved by performing a corona discharge treatment, a plasma treatment, and an ozone treatment.

For example, a corona treatment is preferably performed on the film surface, of the obtained biaxially oriented polypropylene film, which is brought into contact with the cooling roll, under the condition of an applied current value of 0.30 to 2.0 A using a corona treatment machine manufactured by Softal Corona & Plasma GmbH or the like, and the applied current value is more preferably 0.50 to 2.0 A, further preferably 0.80 to 2.0 A, and particularly preferably 1.5 to 2.0 A.

(Thickness Uniformity)

The lower limit of the thickness uniformity of the biaxially oriented polypropylene film of the present invention is preferably 0%, more preferably 0.1%, further preferably 0.5%, and particularly preferably 1%. The upper limit of the thickness uniformity is preferably 20%, more preferably 17%, further preferably 15%, particularly preferably 12%, and most preferably 10%. When the thickness uniformity is in the above range, defects are less likely to occur during post-processing such as coating and printing, and the biaxially oriented polypropylene film is easily used for applications that require precision.

The measurement method is as follows. A test piece of 40 mm in the width direction is cut out from a steady region where the physical properties of the film are stable in the longitudinal direction of the film, and the film thickness is continuously measured over 20000 mm using a film feeder manufactured by MIKURON k.k. (using the serial number: A90172) and a film thickness continuous measurement device (product name: K-313A wide-range high-sensitivity electronic micrometer) manufactured by Anritsu Corporation, and the thickness uniformity is calculated from the following formula.

Thickness uniformity (%)=[(maximum value of thickness−minimum value of thickness)/average value of thickness]×100

(Film Characteristics)

The biaxially oriented polypropylene film of the present invention is characterized by the following characteristics. Here, the "longitudinal direction" in the biaxially oriented polypropylene film of the present invention is a direction corresponding to a flow direction in the film production process, and the "width direction" is a direction orthogonal to the flow direction in the film production process. For a polypropylene film for which a flow direction in a film production process is unknown, a direction with the highest diffraction intensity of a diffraction intensity distribution obtained when wide-angle X-rays are incident on the film surface in a direction perpendicular thereto and a scattering peak derived from the (110) plane of α-type crystal is scanned in the circumferential direction, is defined as the "width direction", and a direction orthogonal to this direction is defined as the "longitudinal direction".

(Stress at 5% Elongation at 23° C.)

The lower limit of the stress at 5% elongation (F5) in the longitudinal direction at 23° C. of the biaxially oriented polypropylene film of the present invention is 40 MPa, preferably 42 MPa, more preferably 43 MPa, further preferably 44 MPa, and particularly preferably 45 MPa. When the F5 is not lower than 40 MPa, the stiffness is high, so that a bag shape when the film is made into a packaging bag is easily maintained, and the film is less likely to be deformed during processing such as printing. The upper limit of the F5 in the longitudinal direction is preferably 70 MPa, more preferably 65 MPa, further preferably 62 MPa, particularly preferably 61 MPa, and most preferably 60 MPa. When the F5 is not higher than 70 MPa, practical production is facilitated, and the longitudinal-width balance is easily improved.

The lower limit of the F5 in the width direction at 23° C. of the biaxially oriented polypropylene film of the present invention is 160 MPa, preferably 165 MPa, more preferably 168 MPa, and further preferably 170 MPa. When the F5 is not lower than 160 MPa, the stiffness is high, so that a bag shape when the film is made into a packaging bag is easily maintained, and the film is less likely to be deformed during processing such as printing. The upper limit of the F5 in the width direction is preferably 250 MPa, more preferably 245 MPa, and further preferably 240 MPa. When the F5 is not higher than 250 MPa, practical production is facilitated, and the longitudinal-width balance is easily improved.

The F5 can be set to be in the range by adjusting the stretching ratio or relaxation rate, or adjusting the temperature during film formation.

(150° C. Heat Shrinkage Rate)

The upper limit of the heat shrinkage rate in the longitudinal direction at 150° C. of the biaxially oriented polypropylene film of the present invention is 7%, preferably 6.0%, and more preferably 5.0%, particularly preferably 4.0%, and most preferably 3.0%. The upper limit of the heat shrinkage rate in the width direction at 150° C. is 16%, preferably 16%, and more preferably 15%, further preferably 12%, most preferably 10%. When the heat shrinkage rate in the longitudinal direction is not higher than 10% and the heat shrinkage rate in the width direction is not higher than 30%, wrinkles are less likely to occur during heat sealing. In particular, when the heat shrinkage rate in the longitudinal direction at 150° C. is not higher than 8.0% and the heat shrinkage rate in the width direction at 150° C. is not higher than 15%, the strain when a chuck portion is fused to an opening portion is very small, so that such heat shrinkage rates are preferable. To decrease the heat shrinkage rate at 150° C., it is effective to set the lower limit of the amount of the component having a molecular weight of 100,000 or less when a gel permeation chromatography (GPC) integration curve of the polypropylene resin included in the film is measured, to be 35% by mass.

The biaxially oriented polypropylene film of the present invention more preferably has the following properties and structure.

(120° C. Heat Shrinkage Rate)

The upper limit of the heat shrinkage rate in the longitudinal direction at 120° C. of the biaxially oriented polypropylene film of the present invention is preferably 2.0%, more preferably 1.7%, further preferably 1.5%, and particularly preferably 1.0%. When the heat shrinkage rate is not higher than 2.0%, a printing pitch shift is less likely to occur when printing ink is transferred. The upper limit of the heat shrinkage rate in the width direction at 120° C. is 5.0%, preferably 4.0%, more preferably 3.0%, further preferably 2.0%, and particularly preferably 1.5%. When the heat shrinkage rate is not higher than 5.0%, wrinkles are less likely to occur during heat sealing.

When the heat shrinkage rate in the longitudinal direction at 120° C. is lower than the heat shrinkage rate in the width direction at 120° C., a printing pitch shift is further less likely to occur when printing ink is transferred. The heat shrinkage rate at 120° C. and the balance between the heat shrinkage rates in the longitudinal direction and the width direction can be set to be in the ranges by adjusting the stretching ratio, the stretching temperature, or the heat setting temperature.

(Refractive Index)

The lower limit of the refractive index (Nx) in the longitudinal direction of the biaxially oriented polypropylene film of the present invention is preferably 1.4970, more preferably 1.4990, further preferably 1.5000, and particularly preferably 1.5020. When the refractive index (Nx) is not lower than 1.4970, the stiffness of the film is easily increased. The upper limit of the refractive index (Nx) in the longitudinal direction is preferably 1.5100, more preferably 15070, and further preferably 1.5050. When the refractive index (Nx) is not higher than 1.5100, the balance between the characteristics in the longitudinal direction and the width direction of the film is likely to be excellent.

The lower limit of the refractive index (Ny) in the width direction of the biaxially oriented polypropylene film of the present invention is 1.5230, preferably 1.5240, and more preferably 1.5250. When the refractive index (Ny) is not lower than 1.5230, the stiffness of the film is easily increased. The upper limit of the refractive index (Ny) in the width direction is preferably 1.5280, more preferably 1.5275, and further preferably 1.5270. When the refractive index (Ny) is not higher than 1.5280, the balance between the characteristics in the longitudinal direction and the width direction of the film is likely to be excellent.

The lower limit of the refractive index (Nz) in the thickness direction of the biaxially oriented polypropylene film of the present invention is preferably 1.4960, more preferably 14970, further preferably 1.4990, and particularly preferably 1.5000. When the refractive index (Nz) is not lower than 1.4960, the stiffness of the film is easily increased. The upper limit of the refractive index (Nz) in the thickness direction is preferably 1.5020, more preferably 1.5015, and further preferably 1.5010. When the refractive index (Nz) is not higher than 1.5020, the heat resistance of the film is easily increased.

The refractive index can be set to be in the range by adjusting the stretching ratio, the stretching temperature, or the heat setting temperature.

(ΔNy)

The lower limit of the ΔNy, the degree of orientation in the width direction of the biaxially oriented polypropylene film of the present invention is 0.0220, preferably 0.0230, more preferably 0.0235, and further preferably 0.0240. When the ΔNy is not lower than 0.0220, the stiffness of the film is likely to be increased. The upper limit of the ΔNy, as a realistic value, is preferably 0.0270, more preferably 0.0265, further preferably 0.0262, and particularly preferably 0.0260. When the ΔNy is not higher than 0.0270, the thickness unevenness is also likely to be good. The ΔNy can be set to be in the range by adjusting the stretching ratio, the stretching temperature, or the heat setting temperature of the film.

The ΔNy is calculated by the following formula with the refractive indexes along the longitudinal direction, the width direction, and the thickness direction of the film as Nx, Ny, and Nz, respectively, and means the degree of orientation in the width direction with respect to the entire orientation in the longitudinal direction, the width direction, and the thickness direction of the film.

$$\Delta Ny = Ny - [(Nx+Nz)/2]$$

(Plane Orientation Coefficient)

The lower limit of the plane orientation coefficient (ΔP) of the biaxially oriented polypropylene film of the present invention is preferably 0.0135, more preferably 0.0138, and further preferably 0.0140. When the plane orientation coefficient is not lower than 0.0135, the balance in the surface direction of the film is good, and the thickness unevenness is also good. The upper limit of the plane orientation coefficient (ΔP), as a realistic value, is preferably 0.0155, more preferably 0.0152, and further preferably 0.0150. When the plane orientation coefficient (ΔP) is not higher than 0.0155, the heat resistance at high temperature is likely to be excellent. The plane orientation coefficient (ΔP) can be set to be in the range by adjusting the stretching ratio, the stretching temperature, or the heat setting temperature.

Moreover, the plane orientation coefficient (ΔP) is calculated using (formula) [(Nx+Ny)/2]−Nz.

(Haze)

The upper limit of the haze of the biaxially oriented polypropylene film of the present invention is preferably 5.0%, more preferably 4.5%, further preferably 4.0%, particularly preferably 3.5%, and most preferably 3.0%. When the haze is not higher than 5.0%, the biaxially oriented polypropylene film is easily used for applications that require transparency. The lower limit of the haze, as a realistic value, is preferably 0.1%, more preferably 0.2%, further preferably 0.3%, and particularly preferably 0.4%. When the haze is not lower than 0.1%, the biaxially oriented polypropylene film is easily produced. The haze can be set to be in the range by adjusting the cooling roll (CR) temperature, the width-direction stretching temperature, the preheating temperature before tenter stretching in the width direction, the width-direction stretching temperature, or the heat setting temperature, or the amount of the component having a molecular weight of 100,000 or less in the polypropylene resin, but may be increased by adding an antiblocking agent or providing a seal layer.

(Practical Characteristics of Film)

The practical characteristics of the biaxially oriented polypropylene film of the present invention will be described.

(Tensile Breaking Strength)

The lower limit of the tensile breaking strength in the longitudinal direction of the biaxially oriented polypropylene film of the present invention is preferably 90 MPa, more preferably 95 MPa, and further preferably 100 MPa. When the tensile breaking strength is not lower than 90 MPa, a printing pitch shift is less likely to occur when printing ink is transferred, and the durability of a packaging bag is likely to be excellent. The upper limit of the tensile breaking strength in the longitudinal direction, as a realistic value, is preferably 200 MPa, more preferably 190 MPa, and further preferably 180 MPa. When the tensile breaking strength is not higher than 200 MPa, film breakage and packaging bag breakage are less likely to occur.

The lower limit of the tensile breaking strength in the width direction of the biaxially oriented polypropylene film of the present invention is preferably 320 MPa, more preferably 340 MPa, and further preferably 350 MPa. When the tensile breaking strength is not lower than 320 MPa, a printing pitch shift is less likely to occur when printing ink is transferred, and the durability of a packaging bag is likely to be excellent. The upper limit of the tensile breaking strength in the width direction, as a realistic value, is preferably 500 MPa, more preferably 480 MPa, and further preferably 470 MPa. When the tensile breaking strength is not higher than 500 MPa, film breakage and packaging bag breakage are less likely to occur.

The tensile breaking strength can be set to be in the range by adjusting the stretching ratio, the stretching temperature, or the heat setting temperature.

(Tensile Elongation at Break)

The lower limit of the tensile elongation at break in the longitudinal direction of the biaxially oriented polypropylene film of the present invention is preferably 50%, more preferably 55%, and further preferably 60%. When the tensile elongation at break is not lower than 50%, film breakage and packaging bag breakage are less likely to occur. The upper limit of the tensile elongation at break in the longitudinal direction, as a realistic value, is preferably 230%, more preferably 220%, and further preferably 210%. When the tensile elongation at break is not higher than 230%, a printing pitch shift is less likely to occur when printing ink is transferred, and the durability of a packaging bag is likely to be excellent.

The lower limit of the tensile elongation at break in the width direction of the biaxially oriented polypropylene film of the present invention is preferably 10%, more preferably 15%, and further preferably 17%. When the tensile elongation at break is not lower than 10%, film breakage and packaging bag breakage are less likely to occur. The upper limit of the tensile elongation at break in the width direction is preferably 60%, more preferably 55%, and further preferably 50%. When the tensile elongation at break is not higher than 60%, a printing pitch shift is less likely to occur when printing ink is transferred, and the durability of a packaging bag is likely to be excellent.

The tensile elongation at break can be set to be in the range by adjusting the stretching ratio, the stretching temperature, or the heat setting temperature.

(Loop Stiffness Stress)

The lower limit of the loop stiffness stress S (mN) in the longitudinal direction at 23° C. of the biaxially oriented polypropylene film of the present invention is preferably $0.00020 \times t^3$, more preferably $0.00025 \times t^3$, further preferably $0.00030 \times t^3$, and particularly preferably $0.00035 \times t^3$, when the thickness of the biaxially oriented polypropylene film is denoted by t (μm). When the loop stiffness stress S (mN) is not lower than $0.00020 \times t^3$, the shape of a package is easily maintained. The upper limit of the loop stiffness stress S (mN) in the longitudinal direction at 23° C. is preferably $0.00080 \times t^3$, more preferably $0.00075 \times t^3$, further preferably $0.00072 \times t^3$, and particularly preferably $0.00070 \times t^3$. When the loop stiffness stress S (mN) is not higher than $0.00080 \times t^3$, it is easy to practically produce the film.

The lower limit of the loop stiffness stress S (mN) in the width direction at 23° C. of the biaxially oriented polypropylene film of the present invention is preferably $0.0010 \times t^3$, more preferably $0.0011 \times t^3$, further preferably $0.0012 \times t^3$, and particularly preferably $0.0013 \times t^3$, when the thickness of the biaxially oriented polypropylene film is denoted by t (μm). When the loop stiffness stress S (mN) is not lower than $0.0010 \times t^3$, the shape of a package is easily maintained. The upper limit of the loop stiffness stress S (mN) in the width direction at 23° C. is preferably $0.0020 \times t^3$, more preferably $0.0019 \times t^3$, further preferably $0.0018 \times t^3$, and particularly preferably $0.0017 \times t^3$. When the loop stiffness stress S (mN) is not higher than $0.0020 \times t^3$, it is easy to practically produce the film.

The loop stiffness stress is an index representing the stiffness of the film, and also depends on the thickness of the film. The measurement method therefor is as follows. Two strips of 110 mm×25.4 mm were cut out, with the longitudinal direction of the film as the long axis of the strip (loop direction) or the width direction of the film as the long axis of the strip (loop direction). A measurement loop in which one surface of the film is the inner surface of the loop and a measurement loop in which the other surface of the film is the inner surface of the loop were produced by pinching these strips with clips such that the long axes of the strips were the longitudinal direction and the width direction of the film, respectively. The measurement loop in which the long axis of the strip is the longitudinal direction of the film was set on the chuck part of the loop stiffness tester DA manufactured by Toyo Seiki Seisaku-sho, Ltd., in a state where the width direction was vertical, the clip was removed, and a loop stiffness stress was measured with a chuck interval of 50 mm, a pushing depth of 15 mm, and a compression rate of 3.3 mm/sec.

In the measurement, the loop stiffness stress and the thickness of the measurement loop in which the one surface of the film is the inner surface of the loop were measured five times, and then the loop stiffness stress and the thickness of the measurement loop in which the other surface of the film is the inner surface of the loop were also measured five times. Using data of the total of 10 measurements, the cube of the thickness (μm) of each test piece was plotted on the horizontal axis, and the loop stiffness stress (mN) of each test piece was plotted on the vertical axis, and the plotted line was approximated with a straight line having an intercept of 0 to obtain a gradient a thereof. The gradient a means a characteristic value specific to the film that does not depend on the thickness which determines the stiffness. The gradient a was used as an evaluation value of stiffness. The measurement loop in which the long axis of the strip is the width direction of the film was also measured in the same manner.

(Wrinkles During Heat Sealing)

To form a bag for packaging food, a pre-made bag is filled with contents and heated to melt and fuse the film, thereby hermetically sealing the bag. In many cases, the same procedure is also performed when making a bag while filling the bag with food. Usually, a sealant film made of polyethylene, polypropylene, or the like is laminated on a base film, and the surfaces of the sealant film are fused to each other. As for a heating method, pressure is applied from the base film side with a heating plate to hold the film to seal the film, but the sealing width is often about 10 mm. At this time, the base film is also heated, and the shrinkage at that time causes wrinkles. For the durability of the bag, it is better to have fewer wrinkles, and in order to increase purchasing motivation, it is also better to have fewer wrinkles. The sealing temperature may be about 120° C., but in order to increase the bag-making processing speed, the sealing temperature is required to be higher. Even in this case, the shrinkage is preferably small. In the case of fusing a chuck to the opening portion of the bag, sealing at a higher temperature is required.

(Lamination Strength)

The lower limit of the lamination strength in the width direction of the biaxially oriented polypropylene film of the present invention is preferably 1.0 N/15 mm, more preferably 1.1 N/15 mm, further preferably 1.2 N/15 mm, even further preferably 1.3 N/15 mm, particularly preferably 1.4 N/15 mm, and most preferably 1.5 N/15 mm. When the lamination strength is not lower than 1.0 N/15 mm, a packaging bag is less likely to be broken. The upper limit of the lamination strength in the width direction, as a realistic value, is preferably 2.5 N/15 mm and more preferably 2.2 N/15 mm.

The lower limit of the lamination strength in the longitudinal direction of the biaxially oriented polypropylene film of the present invention is preferably 1.2 N/15 mm, more preferably 1.3 N/15 mm, further preferably 1.4 N/15 mm, even further preferably 1.5 N/15 mm, and particularly preferably 1.6 N/15 mm. When the lamination strength is not lower than 1.2 N/15 mm, a packaging bag is less likely to be broken. The upper limit of the lamination strength in the longitudinal direction, as a realistic value, is preferably 2.7 N/15 mm and more preferably 2.5 N/15 mm.

(Surface Specific Resistance Test)

The surface specific resistance of the surface of the biaxially oriented polypropylene film of the present invention is preferably not larger than 15Ω/□, more preferably not larger than 14.5Ω/□, further preferably not larger than 14.0Ω/□, and particularly preferably not larger than 13.5Ω/□. When the surface specific resistance is not larger than 15Ω/□, the film roll and the film during processing are less electrified, so that bag-making processing is easily performed, and defects are also likely to be reduced in obtained bags. The lower limit of the surface specific resistance length, as a realistic value, is preferably 10 N/15 mm and more preferably 11 N/15 mm.

(Printing Pitch Shift)

As for the structure of a packaging film, as a basic structure, the packaging film is often composed of a laminated film of a printed base film and a sealant film. For producing a bag, a bag making machine is used, and various bag making machines are used for three-sided bags, standing bags, gusset bags, etc. It is considered that a printing pitch shift occurs since the base material of the film expands and contracts due to tension and heat being applied to the film during a printing step. Eliminating defective products due to a printing pitch shift is important in terms of effective use of resources, and is also important in order to increase purchasing motivation.

(Film Processing)

The biaxially oriented polypropylene film of the present invention can be printed by letterpress printing, lithographic printing, intaglio printing, stencil printing, or transfer printing, depending on the application.

Moreover, an unstretched sheet, a uniaxially stretched film, or a biaxially stretched film each made of a low-density polyethylene, a linear low-density polyethylene, an ethylene-vinyl acetate copolymer, polypropylene, or polyester can be attached as a sealant film, and the biaxially oriented polypropylene film can be used as a laminated body to which heat sealability is imparted. Furthermore, in the case of enhancing the gas barrier properties and heat resistance, an unstretched sheet, a uniaxially stretched film, or a biaxially stretched film each made of aluminum foil, polyvinylidene chloride, nylon, an ethylene-vinyl alcohol copolymer, or polyvinyl alcohol can be provided as an intermediate layer between the biaxially oriented polypropylene film and the sealant film. An adhesive applied by a dry lamination method or a hot melt lamination method can be used for attaching the sealant film.

In order to enhance the gas barrier properties, aluminum or an inorganic oxide can be vapor-deposited on the biaxially oriented polypropylene film, the intermediate layer film, or the sealant film. As the vapor deposition method, vacuum vapor deposition, sputtering, and ion plating methods can be adopted, and silica, alumina, or a mixture thereof is particularly preferably vacuum-deposited.

The biaxially oriented polypropylene film of the present invention can be made suitable for packaging fresh products made of plants that require high freshness such as vegetables, fruits, and flowers, for example, by setting the existence amount of an antifogging agent, such as fatty acid esters of polyhydric alcohols, amines of higher fatty acids, amides of higher fatty acids, amines of higher fatty acids, and ethylene oxide adducts of amides, in the film to be in the range of 0.2 to 5% by mass.

Moreover, as long as the effect of the present invention is not impaired, various additives for improving quality such as slipperiness and antistatic properties, for example, a lubricant such as wax and metal soap for improving productivity, a plasticizer, a processing aid, a heat stabilizer, an antioxidant, an antistatic agent, an ultraviolet absorber, etc., can also be blended.

INDUSTRIAL APPLICABILITY

Since the biaxially oriented polypropylene film of the present invention has the above-described excellent properties that have not been found in the conventional art, the biaxially oriented polypropylene film can be preferably used for a packaging bag, and the thickness of the film can be made thinner than a conventional film.

Furthermore, the biaxially oriented polypropylene film of the present invention is also suitable for applications intended for use at high temperature, such as insulating films for capacitors and motors, back sheets for solar cells, barrier films for inorganic oxides, and base films for transparent conductive films such as ITO, and applications that require stiffness such as separate films. Moreover, coating and printing at high temperature can be performed by using coating agents, inks, laminating adhesives, etc., which have been conventionally difficult to use, so that production can be expected to be efficient.

EXAMPLES

Hereinafter, the present invention will be described in more detail by way of examples. The characteristics were measured and evaluated by the following methods.

(1) Melt Flow Rate

The melt flow rate (MFR) was measured at a temperature of 230° C. with a load of 2.16 kgf according to JISK7210.

(2) Mesopentad Fraction

The mesopentad fraction ([mmmm] %) of the polypropylene resin was measured using $^{13}$C-NMR. The mesopentad fraction was calculated according to the method described in Zambelli et al., Macromolecules, Vol. 6, p 925 (1973). The $^{13}$C-NMR measurement was carried out at 110° C., with 200 mg of a sample being dissolved in an 8:2 mixed solution of o-dichlorobenzene and heavy benzene at 135° C., using AVANCE 500 manufactured by Bruker.

(3) Number-Average Molecular Weight, Weight-Average Molecular Weight, Amount of Component Having Molecular Weight of 100,000 or Less, and Molecular Weight Distribution of Polypropylene Resin Using gel permeation chromatography (GPC), the molecular weights were determined as PP-equivalent molecular weights on the basis of monodisperse polystyrene. When the baseline was not clear, a baseline was set in a range to the lowest position of the skirt, on the high molecular weight side, of an elution peak on the high molecular weight side closest to the elution peak of the standard substance.

The GPC measurement conditions are as follows.
Equipment: HLC-8321 PC/HT (manufactured by Tosoh Corporation)
Detector: RI
Solvent: 1,2,4-trichlorobenzene+dibutylhydroxytoluene (0.05%)
Column: TSKgel guard column HHR (30) HT (7.5 mm I.D.×7.5 cm)×1+TSKgel GMHHR-H (20) HT (7.8 mm I.D.×30 cm)×3
Flow rate: 1.0 mL/min
Injection volume: 0.3 mL
Measurement temperature: 140° C.

The number-average molecular weight (Mn) and the mass-average molecular weight (Mw) are defined by the following formula with the number of molecules ($N_i$) of a molecular weight ($M_i$) at each elution position of a GPC curve obtained via a molecular weight calibration curve, respectively.

Number-average molecular weight: $Mn=\Sigma(N_i \cdot M_i)/\Sigma N_i$

Mass-average molecular weight: $Mw=\Sigma(N_i \cdot M_i^2)/\Sigma(N_i \cdot M_i)$ Here, the molecular weight distribution can be obtained by Mw/Mn.

Moreover, the proportion of the component having a molecular weight of 100,000 or less was obtained from the integral curve of the molecular weight distribution obtained by GPC.

(4) Crystallization Temperature (Tc) and Melting Temperature (Tm)

Heat measurement was performed in a nitrogen atmosphere using the Q1000 differential scanning calorimeter manufactured by TA Instruments. Approximately 5 mg was cut out from polypropylene resin pellets and sealed in an aluminum pan for measurement. The temperature was raised to 230° C. and maintained for 5 minutes, then cooling was performed to 30° C. at a rate of −10° C./min, and the exothermic peak temperature was regarded as the crystallization temperature (Tc). The heat quantity of crystallization (ΔHc) was determined by setting a baseline such that the area of the exothermic peak was smoothly connected from the start of the peak to the end of the peak. The temperature was maintained as it was at 30° C. for 5 minutes, then raised to 230° C. at 10° C./min, and the main endothermic peak temperature was regarded as the melting temperature (Tm).

(5) Film Thickness
The thickness of a film was measured using Millitron 1202D manufactured by Seiko EM.

(6) Haze
The haze was measured according to JISK7105 at 23° C. using NDH5000 manufactured by NIPPON DENSHOKU INDUSTRIES CO., LTD.

(7) Tensile Test
The tensile strength in the longitudinal direction and the width direction of a film was measured at 23° C. according to JISK7127. A sample having a size of 15 mm×200 mm was cut out from the film, and set in a tensile tester (dual column desktop tester Instron 5965, manufactured by Instron Japan Company Limited) with a chuck width of 100 mm. A tensile test was performed at a tensile rate of 200 mm/min. From the obtained strain-stress curve, stress at 5% elongation was determined as F5. The tensile breaking strength and the tensile elongation at break were defined as the strength and the elongation at the time when the sample became broken, respectively.

(8) Heat Shrinkage Rate
The heat shrinkage rate was measured by the following method according to JISZ1712. A film was cut into a width of 20 mm and a length of 200 mm in the longitudinal direction and the width direction of the film, respectively, hung in a hot air oven set at 120° C. or 150° C., and heated for 5 minutes. The length after heating was measured, and the heat shrinkage rate was calculated as the ratio of the length after shrinkage to the original length.

(9) Refractive Index, ΔNy, and Plane Orientation Coefficient
Measurement was performed at a wavelength of 589.3 nm and a temperature of 23° C. using an Abbe refractometer manufactured by ATAGO CO., LTD. The refractive indexes along the longitudinal direction and the width direction of a film were denoted by Nx and Ny, respectively, and the refractive index in the thickness direction was denoted by Nz. ΔNy, the degree of orientation in the width direction, was obtained by (formula) ΔNy=Ny−[(Nx+Nz)/2] using Nx, Ny, and Nz. In addition, the plane orientation coefficient (ΔP) was calculated using (formula) ΔP=[(Nx+Ny)/2]−Nz.

(12) Loop Stiffness Stress
Ten strip-shaped test pieces of 110 mm×25.4 mm were cut out, with the longitudinal direction of the film as the long axis of the strip (loop direction) or the width direction of the film as the long axis of the strip (loop direction). A measurement loop in which one surface of the film is the inner surface of the loop and a measurement loop in which the other surface of the film is the inner surface of the loop were produced by pinching these test pieces with clips such that the long axes of the strips were the longitudinal direction and the width direction of the film, respectively. The measurement loop in which the long axis of the strip is the longitudinal direction of the film was set on the chuck part of the loop stiffness tester DA manufactured by Toyo Seiki Seisaku-sho, Ltd., in a state where the width direction was vertical, the clip was removed, and a loop stiffness stress was measured with a chuck interval of 50 mm, a pushing depth of 15 mm, and a compression rate of 3.3 mm/sec.

In the measurement, the loop stiffness stress and the thickness of the measurement loop in which the one surface of the film is the inner surface of the loop were measured five times, and then the loop stiffness stress and the thickness of the measurement loop in which the other surface of the film is the inner surface of the loop were also measured five times. Using data of the total of 10 measurements, the cube of the thickness (μm) of each test piece was plotted on the horizontal axis, and the loop stiffness stress (mN) of each test piece was plotted on the vertical axis, and the plotted line was approximated with a straight line having an intercept of 0 to obtain a gradient a thereof. The gradient a was used as an evaluation value of stiffness. The measurement loop in which the long axis of the strip is the width direction of the film was also measured in the same manner.

(13) Lamination Strength

The lamination strength was measured by the following procedure.

1) Production of Laminate Film with Sealant Film

Laminate film production was performed using a continuous dry laminating machine as follows. First, each of the corona surfaces of the biaxially oriented polypropylene films obtained in Examples and Comparative Examples was gravure-coated with an adhesive such that the coating amount of the adhesive when dried was 3.0 g/m$^2$, and then each biaxially oriented polypropylene film was guided into a drying zone and dried at 80° C. for 5 seconds. Subsequently, the film was laminated with a sealant film between rolls provided on the downstream side (roll pressure: 0.2 MP, roll temperature: 60° C.). The obtained laminate film was aged at 40° C. for 3 days in a wound state.

As the adhesive, an ether-based adhesive obtained by mixing 17.9% by mass of a main agent (TM329, manufactured by Toyo-Morton, Ltd.), 17.9% by mass of a curing agent (CAT8B, manufactured by Toyo-Morton, Ltd.), and 64.2% by mass of ethyl acetate was used, and as the sealant film, a non-biaxially oriented polypropylene film manufactured by TOYOBO CO., LTD. (PYLEN (registered trademark) CT P1128, thickness: 30 μm) was used.

The obtained laminate film was cut out into strip shapes (length: 200 mm, width: 15 mm) having long sides in the longitudinal direction and the width direction of the biaxially oriented polypropylene film, and the peel strength (N/15 mm) when the film was peeled at 90° (in a T-shape) at a tensile speed of 200 mm/minute under an environment of 23° C. was measured using a tensile tester (TENSILON, manufactured by ORIENTEC CORPORATION). The measurement was performed three times, and the averages of the measurements were used as the lamination strengths in the longitudinal direction and the width direction.

(14) Surface Specific Resistance Test

For each of the corona surfaces of the biaxially oriented polypropylene films obtained in Examples and Comparative Examples, the surface specific resistance (Ω/□) of the obtained film surface was measured according to ASTM D257. The measurement temperature and humidity were 23° C. and 65% RH.

Example 1

[Base Layer (A)]

As a polypropylene resin, 0.9912 parts by weight of stearylamine monostearate (ANSTEX SA321, manufactured by TOHO CHEMICAL INDUSTRY Co., Ltd.) which is an antifogging agent as the compound (A) and 0.156 parts by weight of glycerol monostearate (ANSTEX MG100, manufactured by TOHO CHEMICAL INDUSTRY Co., Ltd.) which is an antifogging agent as the compound (B) were blended and mixed into 100 parts by weight of a blend of 80 parts by weight of a propylene homopolymer PP-1 (FLX80E4, manufactured by SUMITOMO CHEMICAL COMPANY, LIMITED) having an MFR of 7.5 g/10 min, [mmmm] of 98.9%, a Tc of 116.2° C., and a Tm of 162.5° C. and 20 parts by weight of a propylene homopolymer PP-2 (EL80F5, manufactured by SUMITOMO CHEMICAL COMPANY, LIMITED) having an MFR of 11 g/10 min, [mmmm] of 98.8%, a Tc of 116.5° C., and a Tm of 161.5° C., and then the mixture was melt-kneaded and granulated using an extruder equipped with a pelletizer, to obtain pellets of a polypropylene composition as a polypropylene-based resin composition for a base layer (A).

[Intermediate Layer (B)]

As a polypropylene resin, 1.000 parts by weight of stearylamine monostearate (ANSTEX SA321, manufactured by TOHO CHEMICAL INDUSTRY Co., Ltd.) as the compound (A), 0.155 parts by weight of glycerol monostearate (ANSTEX MG100, manufactured by TOHO CHEMICAL INDUSTRY Co., Ltd.) as the compound (B), and 0.0400 parts by weight of stearyl diethanolamine (ANSTEX SA20, manufactured by TOHO CHEMICAL INDUSTRY Co., Ltd.) which is an antifogging agent as the compound (C) were blended and mixed into 100 parts by weight of a blend of: 70 parts by weight of a propylene homopolymer PP-1 (FLX80E4, manufactured by SUMITOMO CHEMICAL COMPANY, LIMITED) having an MFR of 7.5 g/10 min, [mmmm] of 98.9%, a Tc of 116.2° C., and a Tm of 162.5° C.; 20 parts by weight of a propylene homopolymer PP-2 (EL80F5, manufactured by SUMITOMO CHEMICAL COMPANY, LIMITED) having an MFR of 11 g/10 min, [mmmm] of 98.8%, a Tc of 116.5° C., and a Tm of 161.5° C.; and 10 parts by weight of a propylene/ethylene copolymer PP-3 (WF836DG3, manufactured by SUMITOMO CHEMICAL COMPANY, LIMITED) having an MFR of 7.5 g/10 min, a Tc of 111.7° C., and a Tm of 158° C. in which the amount of an ethylene monomer-derived component is 0.6 mol %, and then the mixture was melt-kneaded and granulated using an extruder equipped with a pelletizer, to obtain pellets of a polypropylene composition as a polypropylene-based resin composition for an intermediate layer (B).

[Surface Layer (C)]

As a polypropylene resin, a blend of 64 parts by weight of a propylene homopolymer PP-1 (FLX80E4, manufactured by SUMITOMO CHEMICAL COMPANY, LIMITED) having an MFR of 7.5 g/10 min, [mmmm] of 98.9%, a Tc of 116.2° C., and a Tm of 162.5° C. and 36 parts by weight of a propylene/ethylene copolymer PP-3 (WF836DG3, manufactured by SUMITOMO CHEMICAL COMPANY, LIMITED) having an MFR of 7.5 g/10 min, a Tc of 111.7° C., and a Tm of 158° C. in which the amount of an ethylene monomer-derived component is 0.6 mol % was melt-kneaded and granulated using an extruder equipped with a pelletizer, to obtain pellets of a polypropylene composition as a polypropylene-based resin composition for a surface layer (C).

First, the polypropylene resin compositions for forming the surface layer (C)/base layer (A)/intermediate layer (B)/surface layer (C), respectively, were each heated and melted at 250° C. with an extruder using a multilayer feed block, and were co-extruded into a sheet while the molten polypropylene resin compositions were stacked from a T-die at 250° C.

The surface layer (C) on the base layer (A) side of the molten sheet was brought into contact with a cooling roll set at 20° C., and put into a water bath set at 20° C. as it was. Then, after preheating to 137° C., the sheet was stretched 4.5 times in the longitudinal direction with two pairs of rolls at 142° C., and both ends thereof were pinched with a clip, and the sheet was guided into a hot air oven and preheated at 170° C. Then, the sheet was stretched 10 times in total in the width direction by stretching the sheet 7 times at 168° C. as a first stage, and subsequently stretching the sheet 1.43 times at 145° C. as a second stage. Immediately after stretching in the width direction, the sheet was cooled at 100° C. while being held by the clip, and then heat setting was performed at 165° C. while the sheet was relaxed by 3% in the width direction.

A corona treatment was performed on the film surface, of the obtained biaxially oriented polypropylene film, which had been brought into contact with the cooling roll, under the condition of an applied current value of 0.75 A using a corona treatment machine manufactured by Softal Corona & Plasma GmbH. Then, the film was wound on a winder and used as a biaxially oriented monolayer polypropylene film of the present invention. The thickness of the obtained film was 20 μm.

As for the thickness of the film thus obtained, surface layer (C)/base layer (A)/intermediate layer (B)/surface layer (C)=1/16/2/1 μm. Table 1 shows the structures of the polypropylene resins, Table 2 shows the materials of each layer, and Table 3 shows the film formation conditions. As for the physical properties of the obtained film, the film had high stiffness, a low heat shrinkage rate at high temperature, and high lamination strength as shown in Table 4.

Example 2

The same procedure as in Example 1 was carried out except that the antistatic agent was not included in the intermediate layer (B). Table 1 shows the structures of the polypropylene resins, Table 2 shows the materials of each layer, and Table 3 shows the film formation conditions. As for the physical properties of the obtained film, the film had high stiffness, a low heat shrinkage rate at high temperature, and high lamination strength as shown in Table 4.

Example 3

The same procedure as in Example 1 was carried out except that: the antistatic agent was not included in the intermediate layer (B); and as a polypropylene resin, 1.0752 parts by weight of stearylamine monostearate (ANSTEX SA321, manufactured by TOHO CHEMICAL INDUSTRY Co., Ltd.) as the compound (A) was blended and mixed into 100 parts by weight of a blend of 64 parts by weight of a propylene homopolymer PP-1 (FLX80E4, manufactured by SUMITOMO CHEMICAL COMPANY, LIMITED) having an MFR of 7.5 g/10 min, [mmmm] of 98.9%, a Tc of 116.2° C., and a Tm of 162.5° C. and 36 parts by weight of a propylene/ethylene copolymer PP-3 (WF836DG3, manufactured by SUMITOMO CHEMICAL COMPANY, LIMITED) having an MFR of 7.5 g/10 min, a Tc of 111.7° C., and a Tm of 158° C. in which the amount of an ethylene monomer-derived component is 0.6 mol %, and then the mixture was melt-kneaded and granulated using an extruder equipped with a pelletizer, to obtain pellets of a polypropylene composition as a polypropylene-based resin composition for a surface layer (C). Table 1 shows the structures of the polypropylene resins, Table 2 shows the materials of each layer, and Table 3 shows the film formation conditions. As for the physical properties of the obtained film, the film had high stiffness, a low heat shrinkage rate at high temperature, and high lamination strength as shown in Table 4.

Example 4

The same procedure as in Example 1 was carried out except that the antistatic agent was not included in the base layer (A), and 1.2974 parts by weight of stearylamine monostearate (ANSTEX SA321, manufactured by TOHO CHEMICAL INDUSTRY Co., Ltd.) as the compound (A), 0.155 parts by weight of glycerol monostearate (ANSTEX MG100, manufactured by TOHO CHEMICAL INDUSTRY Co., Ltd.) as the compound (B), and 0.0400 parts by weight of stearyl diethanolamine (ANSTEX SA20, manufactured by TOHO CHEMICAL INDUSTRY Co., Ltd.) as the compound (C) were blended into the intermediate layer (B). Table 1 shows the structures of the polypropylene resins, Table 2 shows the materials of each layer, and Table 3 shows the film formation conditions. As for the physical properties of the obtained film, the film had high stiffness, a low heat shrinkage rate at high temperature, and high lamination strength as shown in Table 4.

Example 5

The same procedure as in Example 1 was carried out except that: as for the thickness of the film, surface layer (C)/base layer (A)/intermediate layer (B)/surface layer (C)=3/16/2/3 μm. Table 1 shows the structures of the polypropylene resins, Table 2 shows the materials of each layer, and Table 3 shows the film formation conditions. As for the physical properties of the obtained film, the film had high stiffness, a low heat shrinkage rate at high temperature, and high lamination strength as shown in Table 4.

Example 6

The same procedure as in Example 1 was carried out except that: as for the thickness of the film, surface layer (C)/base layer (A)/intermediate layer (B)/surface layer (C)=1/4/14/4/1 μm; and stretching was performed in the width direction at 164° C. as a first stage. Table 1 shows the structures of the polypropylene resins, Table 2 shows the materials of each layer, and Table 3 shows the film formation conditions. As for the physical properties of the obtained film, the film had high stiffness, a low heat shrinkage rate at high temperature, and high lamination strength as shown in Table 4.

Example 7

The same procedure as in Example 1 was carried out except that: as for the thickness of the film, surface layer (C)/base layer (A)/intermediate layer (B)/surface layer (C)=1/12/6/1 μm; and stretching was performed in the width direction at 164° C. as a first stage. Table 1 shows the structures of the polypropylene resins, Table 2 shows the materials of each layer, and Table 3 shows the film formation conditions. As for the physical properties of the obtained film, the film had high stiffness, a low heat shrinkage rate at high temperature, and high lamination strength as shown in Table 4.

Example 8

The same procedure as in Example 1 was carried out except that stretching was performed in the width direction at 166° C. as a first stage, and stretching was subsequently performed in the width direction at 162° C. as a second stage. Table 1 shows the structures of the polypropylene resins, Table 2 shows the materials of each layer, and Table 3 shows the film formation conditions. As for the physical properties of the obtained film, the film had high stiffness, a low heat shrinkage rate at high temperature, and high lamination strength as shown in Table 4.

Example 9

The same procedure as in Example 1 was carried out except that as a polypropylene resin, 100 parts by weight of a propylene/ethylene copolymer PP-3 (WF836DG3, manufactured by SUMITOMO CHEMICAL COMPANY, LIMITED) having an MFR of 7.5 g/10 min, a Tc of 111.7° C., and a Tm of 158° C. in which the amount of an ethylene monomer-derived component is 0.6 mol % was used as a polypropylene-based resin composition for a surface layer (C). Table 1 shows the structures of the polypropylene resins, Table 2 shows the materials of each layer, and Table 3 shows the film formation conditions. As for the physical properties of the obtained film, the film had high stiffness, a low heat shrinkage rate at high temperature, and high lamination strength as shown in Table 4.

Example 10

The same procedure as in Example 1 was carried out except that: as a polypropylene resin, 0.9912 parts by weight of stearylamine monostearate (ANSTEX SA321, manufactured by TOHO CHEMICAL INDUSTRY Co., Ltd.) as the compound (A) and 0.156 parts by weight of glycerol monostearate (ANSTEX MG100, manufactured by TOHO CHEMICAL INDUSTRY Co., Ltd.) as the compound (B) were blended and mixed into 100 parts by weight of a blend of 80 parts by weight of a propylene homopolymer PP-1 (FLX80E4, manufactured by SUMITOMO CHEMICAL COMPANY, LIMITED) having an MFR of 7.5 g/10 min, [mmmm] of 98.9%, a Tc of 116.2° C., and a Tm of 162.5° C. and 20 parts by weight of a propylene homopolymer PP-2 (EL80F5, manufactured by SUMITOMO CHEMICAL COMPANY, LIMITED) having an MFR of 11 g/10 min, [mmmm] of 98.8%, a Tc of 116.5° C., and a Tm of 161.5° C., and then the mixture was melt-kneaded and granulated using an extruder equipped with a pelletizer, to obtain pellets of a polypropylene-based resin composition for an intermediate layer (B). Table 1 shows the structures of the polypropylene resins, Table 2 shows the materials of each layer, and Table 3 shows the film formation conditions. As for the physical properties of the obtained film, the film had high stiffness, a low heat shrinkage rate at high temperature, and high lamination strength as shown in Table 4.

Example 11

The same procedure as in Example 1 was carried out except that: as a polypropylene resin, 0.9912 parts by weight of stearylamine monostearate (ANSTEX A321, manufactured by TOHO CHEMICAL INDUSTRY Co., Ltd.) as the compound (A) and 0.156 parts by weight of glycerol monostearate (ANSTEX MG100, manufactured by TOHO CHEMICAL INDUSTRY Co., Ltd.) as the compound (B) were blended and mixed into 100 parts by weight of a blend of 80 parts by weight of a propylene homopolymer PP-1 (FLX80E4, manufactured by SUMITOMO CHEMICAL COMPANY, LIMITED) having an MFR of 7.5 g/10 min, [mmmm] of 98.9%, a Tc of 116.2° C., and a Tm of 162.5° C. and 20 parts by weight of a propylene homopolymer PP-2 (EL80F5, manufactured by SUMITOMO CHEMICAL COMPANY, LIMITED) having an MFR of 11 g/10 min, [mmmm] of 98.8%, a Tc of 116.5° C., and a Tm of 161.5° C., and then the mixture was melt-kneaded and granulated using an extruder equipped with a pelletizer, to obtain pellets of a polypropylene-based resin composition for an intermediate layer (B); and as a polypropylene resin, a blend of 94 parts by weight of a propylene homopolymer PP-1 (FLX80E4, manufactured by SUMITOMO CHEMICAL COMPANY, LIMITED) having an MFR of 7.5 g/10 min, [mmmm] of 98.9%, a Tc of 116.2° C., and a Tm of 162.5° C. and 6 parts by weight of a propylene/ethylene copolymer PP-3 (WF836DG3, manufactured by SUMITOMO CHEMICAL COMPANY, LIMITED) having an MFR of 7.5 g/10 min, a Tc of 111.7° C., and a Tm of 158° C. in which the amount of an ethylene monomer-derived component is 0.6 mol % was used as a polypropylene-based resin composition for a surface layer (C). Table 1 shows the structures of the polypropylene resins, Table 2 shows the materials of each layer, and Table 3 shows the film formation conditions. As for the physical properties of the obtained film, the film had high stiffness and a low heat shrinkage rate at high temperature as shown in Table 4.

Example 12

The same procedure as in Example 1 was carried out except that: as a polypropylene resin, a blend of 94 parts by weight of a propylene homopolymer PP-1 (FLX80E4, manufactured by SUMITOMO CHEMICAL COMPANY, LIMITED) having an MFR of 7.5 g/10 min, [mmmm] of 98.9%, a Tc of 116.2° C., and a Tm of 162.5° C. and 6 parts by weight of a propylene/ethylene copolymer PP-3 (WF836DG3, manufactured by SUMITOMO CHEMICAL COMPANY, LIMITED) having an MFR of 7.5 g/10 min, a Tc of 111.7° C., and a Tm of 158° C. in which the amount of an ethylene monomer-derived component is 0.6 mol % was used as a polypropylene-based resin composition for a surface layer (C). Table 1 shows the structures of the polypropylene resins, Table 2 shows the materials of each layer, and Table 3 shows the film formation conditions. As for the physical properties of the obtained film, the film had high stiffness and a low heat shrinkage rate at high temperature as shown in Table 4.

Comparative Example 1

The same procedure as in Example 1 was carried out except that stretching was performed in the width direction at 162° C. as a first stage. Table 1 shows the structures of the polypropylene resins, Table 2 shows the materials of each layer, and Table 3 shows the film formation conditions. As for the physical properties of the obtained film, the film had high stiffness but had a high heat shrinkage rate at high temperature as shown in Table 4.

Comparative Example 2

The same procedure as in Example 1 was carried out except that: as a polypropylene resin, 0.9554 parts by weight of stearylamine monostearate (ANSTEX SA321, manufactured by TOHO CHEMICAL INDUSTRY Co., Ltd.) as the compound (A), 0.153 parts by weight of glycerol monostearate (ANSTEX MG100, manufactured by TOHO CHEMICAL INDUSTRY Co., Ltd.) as the compound (B), and 0.120 parts by weight of stearyl diethanolamine (ANSTEX SA20, manufactured by TOHO CHEMICAL INDUSTRY Co., Ltd.) as the compound (C) were blended and mixed into 100 parts by weight of a blend of 30 parts by weight of a propylene homopolymer PP-1 (FLX80E4, manufactured by SUMITOMO CHEMICAL COMPANY, LIMITED) having an MFR of 7.5 g/10 min, [mmmm] of 98.9%, a Tc of 116.2° C., and a Tm of 162.5° C., 20 parts by weight of a propylene homopolymer PP-2 (EL80F5, manufactured by SUMITOMO CHEMICAL COMPANY, LIMITED) having an MFR of 11 g/10 min, [mmmm] of 98.8%, a Tc of 116.5° C., and a Tm of 161.5° C., and 50 parts by weight of a propylene/ethylene copolymer PP-3 (WF836DG3, manufactured by SUMITOMO CHEMICAL COMPANY, LIMITED) having an MFR of 7.5 g/10 min, a Tc of 111.7° C., and a Tm of 158° C. in which the amount of an ethylene monomer-derived component is 0.6 mol %, and then the mixture was melt-kneaded and granulated using an extruder equipped with a pelletizer, to obtain pellets of a polypropylene composition as a polypropylene-based resin composition for an intermediate layer (B). Table 1 shows the structures of the polypropylene resins, Table 2 shows the materials of each layer, and Table 3 shows the film formation conditions. As for the physical properties of the obtained film, the film had a low heat shrinkage rate at high temperature but had low stiffness as shown in Table 4.

Comparative Example 3

The same procedure as in Example 1 was carried out except that: as a polypropylene resin, 0.800 parts by weight of stearylamine monostearate (ANSTEX SA321, manufactured by TOHO CHEMICAL INDUSTRY Co., Ltd.) as the compound (A), 0.157 parts by weight of glycerol monostearate (ANSTEX MG100, manufactured by TOHO CHEMICAL INDUSTRY Co., Ltd.) as the compound (B), and 0.200 parts by weight of stearyl diethanolamine (ANSTEX SA20, manufactured by TOHO CHEMICAL INDUSTRY Co., Ltd.) as the compound (C) were blended and mixed into 100 parts by weight of a propylene/ethylene copolymer PP-3 (WF836DG3, manufactured by SUMITOMO CHEMICAL COMPANY, LIMITED) having an MFR of 7.5 g/10 min, a Tc of 111.7° C., and a Tm of 158° C. in which the amount of an ethylene monomer-derived component is 0.6 mol %, and then the mixture was melt-kneaded and granulated using an extruder equipped with a pelletizer, to obtain pellets of a polypropylene composition as a polypropylene-based resin composition for an intermediate layer (B). Table 1 shows the structures of the polypropylene resins, Table 2 shows the materials of each layer, and Table 3 shows the film formation conditions. As for the physical properties of the obtained film, the film had a low heat shrinkage rate at high temperature but had low stiffness as shown in Table 4.

Comparative Example 4

The same procedure as in Example 1 was carried out except that stretching was performed in the width direction at 162° C., the heat setting temperature was set to 168° C., and relaxation was performed by 5% in the width direction. Table 1 shows the structures of the polypropylene resins, Table 2 shows the materials of each layer, and Table 3 shows the film formation conditions. As for the physical properties of the obtained film, the film had a low heat shrinkage rate at high temperature but had low stiffness as shown in Table 4.

TABLE 1

|  | PP-1 | PP-2 | PP-3 |
|---|---|---|---|
| Copolymerization amount of component other than propylene (mol %) | 0 | 0 | 0.6 ethylene |
| MFR (g/10 minutes) | 7.5 | 11 | 7.5 |
| [mmmm] (%) | 98.9 | 98.8 | 96.1 |
| Tc (° C.) | 116.2 | 116.5 | 111.7 |
| Tm (° C.) | 162.5 | 161.5 | 157.4 |
| ΔHc (J/g) | 104.8 | 107.8 | 82.1 |
| Amount of component having molecular weight of 10,000 or less (% by mass) | 4.0 | 6.9 | — |
| Amount of component having a molecular weight of 100,000 or less (% by mass) | 40.5 | 53.1 | — |

TABLE 2

| | | | Example 1 | Example 2 | Example 3 | Example 4 | Example 5 | Example 6 | Example 7 | Example 8 | Example 9 |
|---|---|---|---|---|---|---|---|---|---|---|---|
| Base Layer | FLX80E4 | % by weight | 80 | 80 | 80 | 80 | 80 | 80 | 80 | 80 | 80 |
| | EL80F5 | % by weight | 20 | 20 | 20 | 20 | 20 | 20 | 20 | 20 | 20 |
| Intermediate Layer | FLX80E4 | % by weight | 70 | 70 | 70 | 70 | 70 | 70 | 70 | 70 | 70 |
| | EL80F5 | % by weight | 20 | 20 | 20 | 20 | 20 | 20 | 20 | 20 | 20 |
| | WF836DG3 | % by weight | 10 | 10 | 10 | 10 | 10 | 10 | 10 | 10 | 10 |
| Surface Layer | WF836DG3 | % by weight | 36 | 36 | 36 | 36 | 36 | 36 | 36 | 36 | 100 |
| | FLX80E4 | % by weight | 64 | 64 | 64 | 64 | 64 | 64 | 64 | 64 | 0 |
| Addition Amount of Antistatic Agent in Base Layer | stearylamine monostearate | ppm | 9912 | 9912 | 9912 | 0 | 9912 | 9912 | 9912 | 9912 | 9912 |
| | stearyl diethanolamine | ppm | 0 | 0 | 0 | 0 | 0 | 0 | 0 | 0 | 0 |
| | glycerol monostearate | ppm | 1560 | 1560 | 1560 | 0 | 1560 | 1560 | 1560 | 1560 | 1560 |
| Addition Amount of Antistatic Agent in Intermediate Layer | stearylamine monostearate | ppm | 10000 | 0 | 0 | 12974 | 10000 | 10000 | 10000 | 10000 | 10000 |
| | stearyl diethanolamine | ppm | 400 | 0 | 0 | 400 | 400 | 400 | 400 | 400 | 400 |
| | glycerol monostearate | ppm | 1550 | 0 | 0 | 1550 | 1550 | 1550 | 1550 | 1550 | 1550 |
| Addition Amount of Antistatic Agent in Surface Layer | stearylamine monostearate | ppm | 0 | 0 | 10752 | 0 | 0 | 0 | 0 | 0 | 0 |
| | stearyl diethanolamine | ppm | 0 | 0 | 0 | 0 | 0 | 0 | 0 | 0 | 0 |
| | glycerol monostearate | ppm | 0 | 0 | 0 | 0 | 0 | 0 | 0 | 0 | 0 |
| Total Layer | stearylamine monostearate | ppm | 8930 | 7930 | 9005 | 1297 | 8930 | 8930 | 8930 | 8930 | 8930 |
| | stearyl diethanolamine | ppm | 40 | 0 | 0 | 40 | 40 | 40 | 40 | 40 | 40 |
| | glycerol monostearate | ppm | 1403 | 1248 | 1248 | 155 | 1403 | 1403 | 1403 | 1403 | 1403 |

TABLE 2-continued

|  |  |  | Example 10 | Example 11 | Example 12 | Comparative Example 1 | Comparative Example 2 | Comparative Example 3 | Comparative Example 4 |
|---|---|---|---|---|---|---|---|---|---|
| Base Layer | FLX80E4 | % by weight | 80 | 80 | 80 | 80 | 80 | 80 | 80 |
|  | EL80F5 | % by weight | 20 | 20 | 20 | 20 | 20 | 20 | 20 |
| Intermediate Layer | FLX80E4 | % by weight | 80 | 80 | 70 | 70 | 30 | 0 | 70 |
|  | EL80F5 | % by weight | 20 | 20 | 20 | 20 | 20 | 0 | 20 |
|  | WF836DG3 | % by weight | 0 | 0 | 10 | 10 | 50 | 100 | 10 |
| Surface Layer | WF836DG3 | % by weight | 36 | 6 | 6 | 36 | 36 | 36 | 36 |
|  | FLX80E4 | % by weight | 64 | 94 | 94 | 64 | 64 | 64 | 64 |
| Addition Amount of Antistatic Agent in Base Layer | stearylamine monostearate | ppm | 9912 | 9912 | 9912 | 9912 | 9912 | 9912 | 9912 |
|  | stearyl diethanolamine | ppm | 0 | 0 | 0 | 0 | 0 | 0 | 0 |
|  | glycerol monostearate | ppm | 1560 | 1560 | 1560 | 1560 | 1560 | 1560 | 1560 |
| Addition Amount of Antistatic Agent in Intermediate Layer | stearylamine monostearate | ppm | 9912 | 9912 | 10000 | 10000 | 9554 | 8000 | 10000 |
|  | stearyl diethanolamine | ppm | 0 | 0 | 400 | 400 | 1200 | 2000 | 400 |
|  | glycerol monostearate | ppm | 1560 | 1560 | 1550 | 1550 | 1530 | 1570 | 1550 |
| Addition Amount of Antistatic Agent in Surface Layer | stearylamine monostearate | ppm | 0 | 0 | 0 | 0 | 0 | 0 | 0 |
|  | stearyl diethanolamine | ppm | 0 | 0 | 0 | 0 | 0 | 0 | 0 |
|  | glycerol monostearate | ppm | 0 | 0 | 0 | 0 | 0 | 0 | 0 |
| Addition Amount of Antistatic Agent in Total Layer | stearylamine monostearate | ppm | 8921 | 8921 | 8930 | 8930 | 8885 | 8730 | 8930 |
|  | stearyl diethanolamine | ppm | 0 | 0 | 40 | 40 | 120 | 200 | 40 |
|  | glycerol monostearate | ppm | 1404 | 1404 | 1403 | 1403 | 1401 | 1405 | 1403 |

TABLE 3

|  |  |  | Example 1 | Example 2 | Example 3 | Example 4 | Example 5 | Example 6 | Example 7 | Example 8 |
|---|---|---|---|---|---|---|---|---|---|---|
| Extrusion temperature | Base layer | °C. | 250 | 250 | 250 | 250 | 250 | 250 | 250 | 250 |
|  | Intermediate layer | °C. | 250 | 250 | 250 | 250 | 250 | 250 | 250 | 250 |
|  | Surface layer | °C. | 220 | 220 | 220 | 220 | 220 | 220 | 220 | 220 |
| Cooling roll temperature |  | °C. | 20 | 20 | 20 | 20 | 20 | 20 | 20 | 20 |
| Water bath temperature |  | °C. | 20 | 20 | 20 | 20 | 20 | 20 | 20 | 20 |
| Preheating temperature |  | °C. | 137 | 137 | 137 | 137 | 137 | 137 | 137 | 137 |
| Longitudinal stretching temperature |  | °C. | 142 | 142 | 142 | 142 | 142 | 142 | 142 | 142 |
| Longitudinal stretch ratio |  |  | 4.5 | 4.5 | 4.5 | 4.5 | 4.5 | 4.5 | 4.5 | 4.5 |
| First-stage width stretching temperature |  | °C. | 168 | 168 | 168 | 168 | 168 | 164 | 164 | 166 |
| First-stage width stretch ratio |  |  | 7 | 7 | 7 | 7 | 7 | 7 | 7 | 7 |
| Second-stage width stretching temperature |  | °C. | 145 | 145 | 145 | 145 | 145 | 145 | 145 | 162 |
| Second-stage width stretch ratio |  |  | 3 | 3 | 3 | 3 | 3 | 3 | 3 | 3 |
| Width-direction final stretch ratio |  |  | 10.0 | 10.0 | 10.0 | 10.0 | 10.0 | 10.0 | 10.0 | 10.0 |
| Temperature at end of stretching in width-direction |  | °C. | 100 | 100 | 100 | 100 | 100 | 100 | 100 | 100 |
| Heat treatment temperature |  | °C. | 165 | 165 | 165 | 165 | 165 | 168 | 168 | 168 |
| Relaxation rate during heat treatment |  | % | 3 | 3 | 3 | 3 | 3 | 3 | 3 | 3 |
| Corona discharge applied current value | Cooling roll contact surface | kW | 1 | 1 | 1 | 1 | 1 | 1 | 1 | 1 |
|  | Cooling roll non-contact surface | kw | 1.6 | 1.6 | 1.6 | 1.6 | 1.6 | 1.6 | 1.6 | 1.6 |
| Corona discharge surface temperature | Treatment temperature | °C. | 60 | 60 | 60 | 60 | 60 | 60 | 60 | 60 |
| Thickness of surface layer/base layer/intermediate layer/surface layer |  | μm | 1/16/2/1 | 1/16/2/1 | 1/16/2/1 | 1/16/2/1 | 3/12/2/3 | 1/14/4/1 | 1/12/6/1 | 1/16/2/1 |
| Film thickness |  | μm | 20 | 20 | 20 | 20 | 20 | 20 | 20 | 20 |

|  |  |  | Example 9 | Example 10 | Example 11 | Example 12 | Comparative Example 1 | Comparative Example 2 | Comparative Example 3 | Comparative Example 4 |
|---|---|---|---|---|---|---|---|---|---|---|
| Extrusion temperature | Base layer | °C. | 250 | 250 | 250 | 250 | 250 | 250 | 250 | 250 |
|  | Intermediate layer | °C. | 250 | 250 | 250 | 250 | 250 | 250 | 250 | 250 |
|  | Surface layer | °C. | 220 | 220 | 220 | 220 | 220 | 220 | 220 | 220 |
| Cooling roll temperature |  | °C. | 20 | 20 | 20 | 20 | 20 | 20 | 20 | 20 |
| Water bath temperature |  | °C. | 20 | 20 | 20 | 20 | 20 | 20 | 20 | 20 |
| Preheating temperature |  | °C. | 137 | 137 | 137 | 137 | 137 | 137 | 137 | 137 |
| Longitudinal stretching temperature |  | °C. | 142 | 142 | 142 | 142 | 142 | 142 | 142 | 142 |
| Longitudinal stretch ratio |  |  | 4.5 | 4.5 | 4.5 | 4.5 | 4.5 | 4.5 | 4.5 | 4.5 |
| First-stage width stretching temperature |  | °C. | 168 | 168 | 168 | 168 | 162 | 168 | 168 | 162 |
| First-stage width stretch ratio |  |  | 7 | 7 | 7 | 7 | 7 | 7 | 7 | 7 |
| Second-stage width stretching temperature |  | °C. | 145 | 145 | 145 | 145 | 145 | 145 | 145 | 162 |
| Second-stage width stretch ratio |  |  | 3 | 3 | 3 | 3 | 3 | 3 | 3 | 3 |
| Width-direction final stretch ratio |  |  | 10.0 | 10.0 | 10.0 | 10.0 | 10.0 | 10.0 | 10.0 | 10.0 |
| Temperature at end of stretching in width-direction |  | °C. | 100 | 100 | 100 | 100 | 100 | 100 | 100 | 100 |
| Heat treatment temperature |  | °C. | 165 | 165 | 165 | 165 | 165 | 165 | 165 | 168 |
| Relaxation rate during heat treatment |  | % | 3 | 3 | 3 | 3 | 3 | 3 | 3 | 5 |
| Corona discharge applied current value | Cooling roll contact surface | kW | 1 | 1 | 1 | 1 | 1 | 1 | 1 | 1 |
|  | Cooling roll non-contact surface | kw | 1.6 | 1.6 | 1.6 | 1.6 | 1.6 | 1.6 | 1.6 | 1.6 |

TABLE 3-continued

| | | | | | | | | | | |
|---|---|---|---|---|---|---|---|---|---|---|
| Corona discharge surface temperature | Treatment temperature | ° C. | 60 | 60 | 60 | 60 | 60 | 60 | 60 | 60 |
| Thickness of surface layer/base layer/intermediate layer/surface layer | | μm | 1/16/2/1 | 1/16/2/1 | 1/16/2/1 | 1/16/2/1 | 1/16/2/1 | 1/16/2/1 | 1/16/2/1 | 1/16/2/1 |
| Film thickness | | μm | 20 | 20 | 20 | 20 | 20 | 20 | 20 | 20 |

TABLE 4

| | | | Example 1 | Example 2 | Example 3 | Example 4 | Example 5 | Example 6 | Example 7 | Example 8 |
|---|---|---|---|---|---|---|---|---|---|---|
| Roll stain | | stain/no stain | no stain | no stain | stain | no stain | no stain | no stain | no stain | no stain |
| Haze | | % | 1.8 | 2.5 | 2.2 | 2.2 | 3.2 | 3.3 | 3.5 | 2.8 |
| F5 | MD | MPa | 43 | 41 | 43 | 45 | 44 | 45 | 45 | 46 |
| | TD | MPa | 175 | 164 | 163 | 172 | 174 | 162 | 163 | 166 |
| Young's modulus | MD | GPa | 2.6 | 2.5 | 2.5 | 2.7 | 2.6 | 1.7 | 2.1 | 2.5 |
| | TD | GPa | 6.7 | 6.6 | 6.2 | 6.7 | 6.4 | 5.5 | 5.4 | 6.6 |
| Breaking strength | MD | MPa | 108 | 114 | 107 | 109 | 114 | 111 | 120 | 115 |
| | TD | MPa | 399 | 375 | 399 | 403 | 439 | 452 | 442 | 438 |
| Elongation at break | MD | % | 226 | 235 | 221 | 228 | 217 | 208 | 217 | 223 |
| | TD | % | 26 | 27 | 32 | 33 | 33 | 39 | 31 | 37 |
| Heat shrinkage rate at 120° C. | MD | % | 0.3 | 0.3 | 0.3 | 0.0 | 0.7 | 0.7 | 0.5 | 0.7 |
| | TD | % | 1.3 | 1.5 | 1.3 | 1.3 | 2.0 | 1.3 | 1.2 | 1.7 |
| Heat shrinkage rate at 150° C. | MD | % | 2.3 | 2.0 | 2.7 | 1.7 | 3.6 | 2.8 | 2.4 | 6.3 |
| | TD | % | 9.3 | 10.3 | 9.5 | 8.8 | 9.0 | 13.3 | 13.9 | 9.9 |
| Refractive index | Nx | — | 1.5044 | 1.5040 | 1.5039 | 1.5042 | 1.5009 | 1.5008 | 1.5012 | 1.5021 |
| | Ny | — | 1.5270 | 1.5269 | 1.5269 | 1.5268 | 1.5243 | 1.5252 | 1.5240 | 1.5251 |
| | Nz | — | 1.5014 | 1.5016 | 1.5018 | 1.5015 | 1.4985 | 1.4988 | 1.4982 | 1.4995 |
| Orientation in width direction | ΔNy | — | 0.0241 | 0.0241 | 0.0240 | 0.0239 | 0.0246 | 0.0254 | 0.0243 | 0.0243 |
| Plane orientation coefficient | ΔP | — | 0.0143 | 0.0138 | 0.0136 | 0.0140 | 0.0141 | 0.0142 | 0.0144 | 0.0141 |
| Loop stiffness stress | MD | — | 0.00045 | 0.00045 | 0.00048 | 0.00046 | 0.00044 | 0.00055 | 0.00051 | 0.00046 |
| | TD | — | 0.00122 | 0.00108 | 0.00112 | 0.00110 | 0.00130 | 0.00124 | 0.00127 | 0.00119 |
| Surface specific resistance value after 1 day at 40° C. | Cooling roll contact surface | Ω/□ | 14.1 | 14.2 | 14.3 | 15.0 | 14.5 | 13.5 | 13.2 | 14.5 |
| | Cooling roll non-contact surface | Ω/□ | 13.8 | 14.5 | 14.0 | 15.7 | 14.8 | 13.8 | 13.3 | 12.4 |
| Cooling roll contact surface lamination strength | MD | N/15 mm | 1.2 | 1.7 | 1.2 | 1.3 | 2.0 | 1.2 | 1.2 | 1.3 |
| | TD | N/15 mm | 1.2 | 1.6 | 1.2 | 1.1 | 1.5 | 1.3 | 1.1 | 1.2 |
| Cooling roll non-contact surface lamination strength | MD | N/15 mm | 1.5 | 2.1 | 2.6 | 2.0 | 2.2 | 2.2 | 2.3 | 1.4 |
| | TD | N/15 mm | 1.6 | 2.0 | 2.4 | 1.8 | 2.1 | 2.0 | 2.2 | 1.5 |

| | | | Example 9 | Example 10 | Example 11 | Example 12 | Comparative Example 1 | Comparative Example 2 | Comparative Example 3 | Comparative Example 4 |
|---|---|---|---|---|---|---|---|---|---|---|
| Roll stain | | stain/no stain | no stain | no stain | no stain | no stain | no stain | no stain | no stain | no stain |
| Haze | | % | 8.5 | 3.2 | 3.5 | 2.9 | 2.3 | 2.7 | 3.1 | 2.6 |
| F5 | MD | MPa | 44 | 41 | 41 | 42 | 48 | 42 | 42 | 45 |
| | TD | MPa | 170 | 169 | 163 | 161 | 203 | 157 | 154 | 150 |
| Young's modulus | MD | GPa | 2.5 | 2.4 | 2.5 | 2.2 | 2.6 | 2.6 | 2.4 | 2.6 |
| | TD | GPa | 6.7 | 6.4 | 5.7 | 6.2 | 6.2 | 6.1 | 6.5 | 5.9 |
| Breaking strength | MD | MPa | 115 | 100 | 104 | 104 | 138 | 107 | 108 | 125 |
| | TD | MPa | 429 | 396 | 391 | 387 | 500 | 382 | 396 | 411 |
| Elongation at break | MD | % | 228 | 218 | 222 | 216 | 217 | 221 | 223 | 231 |
| | TD | % | 34 | 35 | 35 | 33 | 30 | 36 | 35 | 35 |
| Heat shrinkage rate at 120° C. | MD | % | 0.9 | 0.3 | 0.3 | 0.3 | 1.3 | 0.5 | 0.5 | 0.8 |
| | TD | % | 2.5 | 1.3 | 1.5 | 1.5 | 2.8 | 1.3 | 1.3 | 1.0 |
| Heat shrinkage rate at 150° C. | MD | % | 4.2 | 1.7 | 1.7 | 1.7 | 7.9 | 1.5 | 2.7 | 5.2 |
| | TD | % | 10.9 | 9.3 | 9.7 | 9.2 | 18.4 | 9.3 | 9.5 | 6.4 |
| Refractive index | Nx | — | 1.5017 | 1.5035 | 1.5039 | 1.5038 | 1.5000 | 1.5036 | 1.5041 | 1.5012 |
| | Ny | — | 1.5261 | 1.5272 | 1.5263 | 1.5260 | 1.5242 | 1.5265 | 1.5261 | 1.5264 |
| | Nz | — | 1.4995 | 1.5013 | 1.5013 | 1.5010 | 1.4972 | 1.5018 | 1.5012 | 1.4990 |
| Orientation in width direction | ΔNy | — | 0.0255 | 0.0248 | 0.0237 | 0.0236 | 0.0256 | 0.0238 | 0.0234 | 0.0263 |
| Plane orientation coefficient | ΔP | — | 0.0144 | 0.0141 | 0.0138 | 0.0139 | 0.0149 | 0.0133 | 0.0138 | 0.0148 |
| Loop stiffness stress | MD | — | 0.00042 | 0.00044 | 0.00046 | 0.00045 | 0.00042 | 0.00045 | 0.00043 | 0.00045 |
| | TD | — | 0.00115 | 0.00106 | 0.00105 | 0.00113 | 0.00136 | 0.00105 | 0.00108 | 0.00114 |

TABLE 4-continued

| | | | | | | | | | | |
|---|---|---|---|---|---|---|---|---|---|---|
| Surface specific resistance value after 1 day at 40° C. | Cooling roll contact surface | Ω/□ | 13.1 | 15.4 | 15.2 | 15.6 | 15.5 | 14.4 | 14.9 | 14.9 |
| | Cooling roll non-contact surface | Ω/□ | 12.5 | 15.1 | 15.3 | 15.3 | 15.3 | 12.3 | 12.4 | 12.8 |
| Cooling roll contact surface lamination strength | MD | N/15 mm | 2.3 | 2.4 | 1.0 | 1.1 | 0.7 | 1.1 | 1.1 | 1.4 |
| | TD | N/15 mm | 2.1 | 1.7 | 0.9 | 0.8 | 0.3 | 1.2 | 1.3 | 1.4 |
| Cooling roll non-contact surface lamination strength | MD | N/15 mm | 1.7 | 2.5 | 1.6 | 1.5 | 0.7 | 1.9 | 1.9 | 1.6 |
| | TD | N/15 mm | 2.2 | 2.4 | 0.9 | 0.8 | 0.4 | 2.2 | 2.8 | 1.5 |

MD: longitudinal direction,
TD: width direction

The invention claimed is:

1. A biaxially oriented polypropylene film, wherein a stress at 5% elongation (F5) at 23° C. of the biaxially oriented polypropylene film is not lower than 40 MPa in a longitudinal direction and not lower than 160 MPa in a width direction, and a heat shrinkage rate at 150° C. of the biaxially oriented polypropylene film is not higher than 7% in the longitudinal direction and not higher than 16% in the width direction.

2. The biaxially oriented polypropylene film according to claim 1, wherein a heat shrinkage rate at 120° C. of the biaxially oriented polypropylene film is not higher than 2.0% in the longitudinal direction and not higher than 5.0% in the width direction, and the heat shrinkage rate at 120° C. in the longitudinal direction is lower than the heat shrinkage rate at 120° C. in the width direction.

3. The biaxially oriented polypropylene film according to claim 1, wherein a refractive index Ny in the width direction of the biaxially oriented polypropylene film is not lower than 1.5230, and ΔNy of the biaxially oriented polypropylene film is not lower than 0.0220.

4. The biaxially oriented polypropylene film according to claim 1, wherein the biaxially oriented polypropylene film has a haze of 5.0% or lower.

5. The biaxially oriented polypropylene film according to claim 1, wherein the biaxially oriented polypropylene film comprises a base layer (A), an intermediate layer (B), and a surface layer (C).

6. The biaxially oriented polypropylene film according to claim 5, wherein a main polypropylene resin forming the base layer (A) has a mesopentad fraction of 97.0% or higher.

7. The biaxially oriented polypropylene film according to claim 5, wherein the main polypropylene resin forming the base layer (A) has a crystallization temperature of 105° C. or higher and a melting point of 160° C. or higher.

8. The biaxially oriented polypropylene film according to claim 5, wherein the main polypropylene resin forming the base layer (A) has a melt flow rate of 4.0 g/10 minutes or higher, as measured at a temperature of 230° C. with a load of 2.16 kgf according to JIS K 7210.

9. The biaxially oriented polypropylene film according to claim 5, wherein an amount of a component having a molecular weight of 100,000 or less in the main polypropylene resin forming the base layer (A) is not smaller than 35% by mass.

10. The biaxially oriented polypropylene film according to claim 2, wherein a refractive index Ny in the width direction of the biaxially oriented polypropylene film is not lower than 1.5230, and ΔNy of the biaxially oriented polypropylene film is not lower than 0.0220.

11. The biaxially oriented polypropylene film according to claim 10, wherein the biaxially oriented polypropylene film has a haze of 5.0% or lower.

12. The biaxially oriented polypropylene film according to claim 11, wherein the biaxially oriented polypropylene film comprises a base layer (A), an intermediate layer (B), and a surface layer (C).

13. The biaxially oriented polypropylene film according to claim 12, wherein a main polypropylene resin forming the base layer (A) has a mesopentad fraction of 97.0% or higher.

14. The biaxially oriented polypropylene film according to claim 12, wherein the main polypropylene resin forming the base layer (A) has a crystallization temperature of 105° C. or higher and a melting point of 160° C. or higher.

15. The biaxially oriented polypropylene film according to claim 12, wherein the main polypropylene resin forming the base layer (A) has a melt flow rate of 4.0 g/10 minutes or higher, as measured at a temperature of 230° C. with a load of 2.16 kgf according to JIS K 7210.

16. The biaxially oriented polypropylene film according to claim 12, wherein an amount of a component having a molecular weight of 100,000 or less in the main polypropylene resin forming the base layer (A) is not smaller than 35% by mass.

* * * * *